United States Patent
Battlogg

(10) Patent No.: US 12,481,379 B2
(45) Date of Patent: Nov. 25, 2025

(54) SLEEVE ARRANGEMENT FOR A MOBILE DEVICE COMPRISING AN INPUT APPARATUS MOUNTED TO A SLEEVE PART

(71) Applicant: INVENTUS Engineering GmbH, St. Anton i.M. (AT)

(72) Inventor: Stefan Battlogg, St. Anton i.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 618 days.

(21) Appl. No.: 17/799,791

(22) PCT Filed: Feb. 15, 2021

(86) PCT No.: PCT/EP2021/053689
§ 371 (c)(1),
(2) Date: Aug. 15, 2022

(87) PCT Pub. No.: WO2021/160897
PCT Pub. Date: Aug. 19, 2021

(65) Prior Publication Data
US 2023/0080681 A1    Mar. 16, 2023

(30) Foreign Application Priority Data

Feb. 14, 2020   (DE) .................... 10 2020 104 011.3
Feb. 21, 2020   (DE) .................... 10 2020 104 705.3
Jun. 26, 2020   (DE) .................... 10 2020 116 941.8

(51) Int. Cl.
G06F 3/0362     (2013.01)
B60K 35/10     (2024.01)
(Continued)

(52) U.S. Cl.
CPC ............ *G06F 3/0362* (2013.01); *B60K 35/10* (2024.01); *F16D 57/002* (2013.01); *F16F 9/535* (2013.01);
(Continued)

(58) Field of Classification Search
CPC ...... A45C 11/00–003; B60K 2360/126; B60K 2360/1446; B60K 35/10; F16D 57/002;
(Continued)

(56) References Cited

U.S. PATENT DOCUMENTS 9,862,099 B1    1/2018   Linnell et al.
10,560,558 B1 *  2/2020   Kosa .................... G06F 1/1669
(Continued)

FOREIGN PATENT DOCUMENTS

CH              703321 B1    12/2011
DE         102015110633 A1    1/2017
(Continued)

OTHER PUBLICATIONS

Spigen Ultra Hybrid Hell, Compatible with iPhone 11, -Crystal Clear-, Manufacturer : Spigen ASIN : B07T2NBLX9 Model No. 076CS27185, On the Internet: https://www.amazon.de/Spigen%C2%AD%20Kompatibei-Einteilige%C2%AD%20Transparent-%20076CS27185/dp/B07T2NBLX9/%20ref=sr-%201-4?-%20mk-de-DE=%20%C3%85M%C3%85%C5%BD%20%C3%95%C3%91&dchild=1&k%20eywords=handyh%20%C3%BClle&qid=1610443047%20&sr=8-4, [researched on Jan. 12, 2021].

*Primary Examiner* — Ronald Eisner
(74) *Attorney, Agent, or Firm* — Laurence A. Greenberg; Werner H. Stemer; Ralph E. Locher

(57) ABSTRACT

A sleeve or case for a mobile device, such as a smartphone or tablet or other types of hand-held device or mobile smart device, has a sleeve part for at least partially enclosing the mobile device and an input device arranged in the sleeve part
(Continued)

for controlling the mobile device which can be received in the sleeve part. The input device includes a movable control element and a magnetorheological brake. Any movement of the control element can be selectively damped by way of the magnetorheological brake.

20 Claims, 10 Drawing Sheets

(51) Int. Cl.
| | |
|---|---|
| *F16D 57/00* | (2006.01) |
| *F16F 9/53* | (2006.01) |
| *G05G 5/03* | (2008.04) |
| *G05G 9/04* | (2006.01) |
| *G05G 25/00* | (2006.01) |
| *G06F 3/01* | (2006.01) |
| *G08B 7/06* | (2006.01) |
| *H04B 1/3888* | (2015.01) |
| *H04M 1/04* | (2006.01) |
| *H04M 1/72409* | (2021.01) |

(52) U.S. Cl.
CPC ............... *G05G 5/03* (2013.01); *G05G 9/04* (2013.01); *G05G 25/00* (2013.01); *G06F 3/016* (2013.01); *G08B 7/06* (2013.01); *H04B 1/3888* (2013.01); *H04M 1/04* (2013.01); *H04M 1/724092* (2022.02); *B60K 2360/126* (2024.01); *B60K 2360/1446* (2024.01); *G05G 2505/00* (2013.01)

(58) Field of Classification Search
CPC ........... F16F 9/535; G05G 1/08; G05G 25/00; G05G 2505/00; G05G 5/03; G05G 9/04; G06F 1/1632; G06F 1/1684; G06F 2200/1633; G06F 3/016; G06F 3/0362; G08B 7/06; H01H 19/003; H01H 19/11; H01H 19/14; H01H 2003/008; H01H 2019/146; H01H 25/008; H03K 17/97; H03K 2217/94068; H04B 1/02–036; H04B 1/3888; H04B 2001/3894; H04M 1/0203; H04M 1/04–185; H04M 1/233; H04M 1/236; H04M 1/724092; H05K 5/0018; H05K 5/02–5/30; H05K 7/12–14

See application file for complete search history.

(56) References Cited

U.S. PATENT DOCUMENTS

| | | |
|---|---|---|
| 10,976,827 B2 | 4/2021 | Battlogg |
| 2006/0033703 A1 | 2/2006 | Olien et al. |
| 2015/0268724 A1 | 9/2015 | Levesque et al. |
| 2016/0103489 A1 | 4/2016 | Cruz-Hernandez et al. |
| 2016/0123059 A1 | 5/2016 | Liu |
| 2018/0049336 A1 | 2/2018 | Manueal et al. |
| 2018/0215342 A1* | 8/2018 | Battlogg ................ F16F 9/537 |
| 2020/0355229 A1 | 11/2020 | Battlogg |

FOREIGN PATENT DOCUMENTS

| | | | |
|---|---|---|---|
| DE | 102018100390 A1 | 7/2019 | |
| EP | 3317749 A1 | 5/2018 | |
| WO | 2012034697 A1 | 3/2012 | |
| WO | 2013163233 A1 | 10/2013 | |
| WO | WO-2018231145 A1 * | 12/2018 | ......... G06F 3/03543 |

* cited by examiner

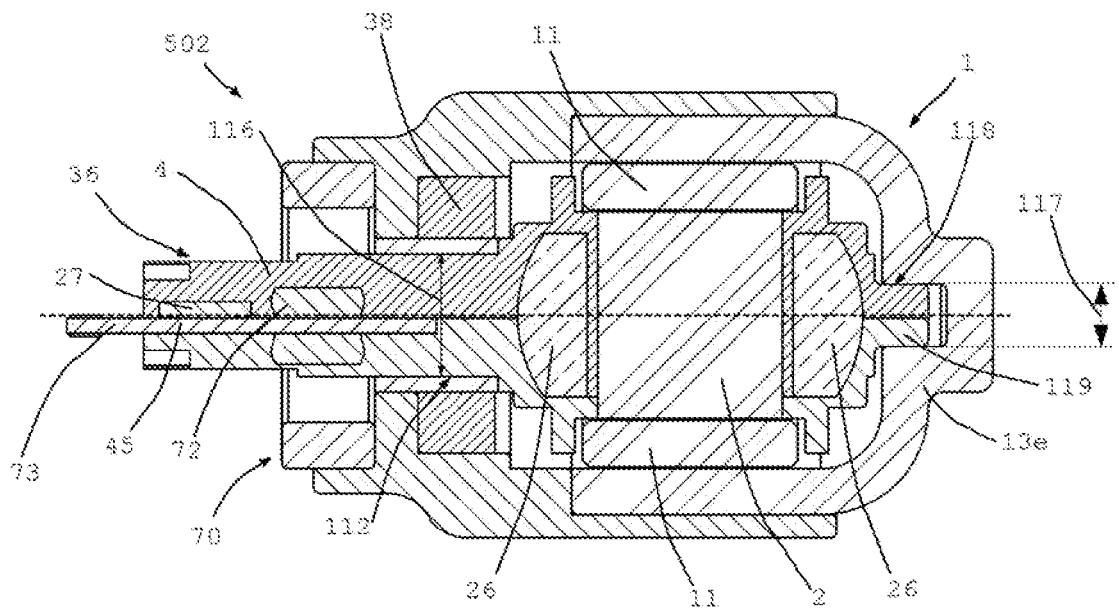
Fig. 13a
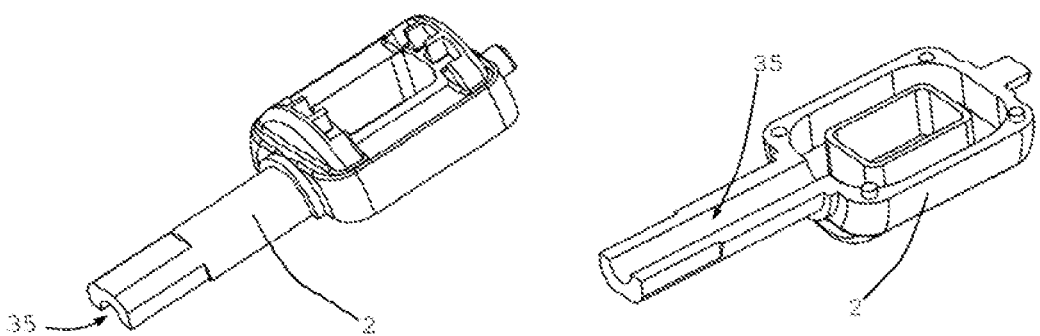
Fig. 13b
Fig. 13c
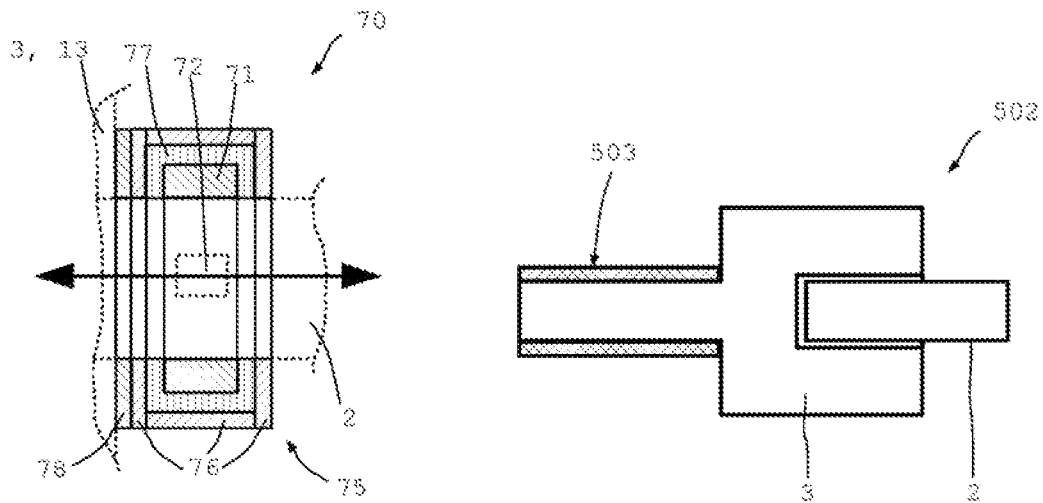
Fig. 13d
Fig. 13e

SLEEVE ARRANGEMENT FOR A MOBILE DEVICE COMPRISING AN INPUT APPARATUS MOUNTED TO A SLEEVE PART

FIELD AND BACKGROUND OF THE INVENTION

The present invention relates to a sleeve apparatus for a mobile device with at least one input apparatus, to a mobile device with at least one input apparatus, and to a method for operating such devices.

Such mobile devices are, for example, handhelds (such as smartphones, foldable smartphones or tablets or touchpads) or other types of smart device (such as, for example, a smart watch) or alternatively notebooks, foldable notebooks, or the like. Particularly critical features of such devices are their size and compactness. Therefore, for example, smartphones or tablets today have only very few push knobs or switches or none at all. Operation is generally almost exclusively via a touch-sensitive display. However, this has a disadvantageous effect on the convenience of operation. For example, users have to look at the display at all times when operating it. In addition, the display then also has to be constantly active for operation. It is also sometimes considered to be inconvenient that the device must be held in the hands in a specific manner when operating it.

Cellphones have become known which have a radar scanner or image identification and can detect touch-free gestures, for example of a user's hand. Such operation functions per se but does require an appropriate detection system such as a radar chip in the mobile device and up until now has been suited only for simple commands.

SUMMARY OF THE INVENTION

The object of the present invention is therefore to improve the operability and in particular the ease of operation of such mobile devices. It is preferably intended that reliable and specific operation is also possible without visually looking at the device or the display. It is preferably intended that simple but also versatile manual operation is enabled, preferably also with gloves. In particular, it is intended that improvement of already existing mobile devices is possible, i.e. inter alia the convenience of operation and the complexity of operation are improved. It is, however, preferably also intended that a solution can be integrated into a mobile device as part of the production process. In particular, it is desirable that the compactness of the mobile devices is not unfavorably affected here.

This object is achieved by a sleeve apparatus as claimed and by a mobile device as claimed. A method according to the invention is also claimed. Preferred developments of the invention are the subject of the dependent claims. Further advantages and features of the device components with a magnetorheological braking apparatus become apparent from the general description and the description of the exemplary embodiments.

The sleeve apparatus according to the invention is provided for a mobile device and in particular for a smartphone, foldable smartphone, or tablet (iPad, Note, . . . ) or for other types of handhelds or mobile smart devices. The sleeve apparatus comprises at least one sleeve part for at least partially surrounding the mobile device. The mobile device can be held at least partially in or on the sleeve part. The sleeve apparatus comprises at least one input apparatus, arranged at least partially in the sleeve part, in order to activate the mobile device which is or can be held in the sleeve part. As a result, the mobile device can be operated from the sleeve part. The input apparatus here comprises at least one movable operating element and at least one braking apparatus. At least one movement (performed as part of the operation) of the operating element can here be damped in a targeted fashion by means of the braking apparatus.

The sleeve apparatus according to the invention offers many advantages. One significant advantage is offered by the operating element, which can be damped in a targeted fashion, of the input apparatus. Thus, a mobile device and, for example, a smartphone or tablet can be equipped inexpensively and simply with a further operating element which offers a wide range of operating options which at the same time are convenient and particularly intuitive. By virtue of the, for example, in particular magnetorheological damping, the invention can be used particularly advantageously to activate a wide range of device functions and, for example, applications. Suitable haptic feedback can be associated with certain device or input functions, as a result of which the user can tell just from the feedback what he is setting and in what operating direction, for example the torque can increase when there is clockwise rotation when the volume of the microphone is increased. This takes place without looking (i.e. by "blind operation"). The use of a motorized braking apparatus is also possible and particularly preferred.

A further particular advantage of the invention is that not only can inputs be made by the user to the mobile device but also haptic feedback can take place from the mobile device to the user. The sleeve apparatus with the manually tactile operating element allows very direct and immediate feedback which can be felt with the finger. Very precise control can consequently be performed. Sensitive and intuitive control is possible as a result of the direct contact with a finger of the hand, which can also be provided with a glove.

At the same time, it is possible in a particularly simple fashion to be able to make use of all these advantages also in the case of an already existing mobile device. For example, to do this, the smartphone or tablet is simply inserted into the sleeve part and coupled to the sleeve apparatus, for example wirelessly via Bluetooth, Ant+, Zig-Bee, or the like.

After coupling, functions can then be started, set, or ended, for example by rotating the operating element. Mechanical or manual actuation can advantageously take place here without the user's eyes having to be directed at the display for a relatively long time.

Particularly preferably, the braking apparatus has magnetorheological design and/or comprises at least one magnetorheological braking apparatus. A or the magnetorheological braking apparatus comprises at least one magnetorheological medium and at least one field-generating apparatus for generating and controlling a magnetic and/or electrical field strength. The rheological (in particular, the magnetorheological) medium can preferably be influenced by means of the or a field-generating apparatus in order to set the torque for the rotatability of the operating element. A magnetorheological braking apparatus offers a particularly large number of advantages.

In particular, the sleeve apparatus comprises at least one control apparatus for activating the braking apparatus. The damping generated by the braking apparatus can be adapted by means of the control apparatus, in particular in a targeted manner.

In particular, an actuating position of the operating element, preferably an angular position and particularly preferably a rotated angular position, is taken into account in order to activate the mobile device. In particular, the input into or activation of the mobile device is effected depending on the actuating position. In particular, for this purpose, at least one specific input into or activation of the mobile device is associated with a defined angle. Within the scope of the present invention, an angle can also be provided by an angular range.

For example, a first input takes place by the operating element being rotated as far as a first angle of rotation or into a first range of angle of rotation. A second input then takes place by rotating the operating element as far as a second angle or into a second range of angle of rotation. The input apparatus presented here can provide at least 30,000 increments or distinct angles of rotation per revolution. In each case at least one input can be associated here with the increments or angles of rotation. The assignment or association of an increment or angle to or with an input then takes place in particular depending on the respective device function and, for example, depending on an app. In particular, this association can be adapted dynamically.

Additionally, the speed and/or direction of the actuation of the operating element and/or time can also be taken into account for this association. For example, a different input can take place because of faster rotation than in the case of slower rotation. In the case of slow rotation, a fine-grained detent pattern (=high/low torque with small angular spacings) can be expedient because something needs to be set/adjusted precisely. In the case of fast rotation, preferably with no detent pattern or with a very weak detent pattern, large setting or adjustment ranges can be covered quickly and with little force at the finger (torque at the operating element). This offers very high-resolution and at the same time particularly simple operation. It is preferred that the operating element can be rotated multiple times and in particular continuously. It is also possible that the angle of rotation is limited and restricted to a certain number of revolutions or to an angular range of one revolution. It is also possible that the torque in one direction of rotation is different from that in the other direction of rotation (clockwise or counterclockwise). The user can thus clearly identify and associate the direction of rotation or setting direction haptically.

The sleeve apparatus preferably comprises at least one sensor apparatus. An actuating position of the operating element can preferably be detected by means of the sensor apparatus. The actuating position of the operating element is defined in particular by an angular position and preferably by a rotated angular position. The actuating position can be detected directly or indirectly.

In particular, the braking apparatus can be activated by means of the control apparatus at least depending on the actuating position of the operating element. In particular, the control apparatus is suited and designed for setting, and preferably adapting in a targeted fashion, the damping of the movement f the operating element and in particular a retarding torque of the braking apparatus depending on the actuating position. It is possible and preferred that different damping and in particular a defined retarding torque can be set depending on the actuating position of the operating element.

The retarding torque which is set for a certain actuating position can, for example, be predefined and/or be determined dynamically by an algorithm. The association of the actuating position and the retarding torque can depend, for example, on which device function and, for example, which application is currently being operated. The association can additionally or alternatively also depend on the speed of movement of the operating element and/or time and/or an actuating force and/or a direction of movement. The control unit can here also be intelligent (artificial intelligence, machine learning). Certain operations or sequences of operations (operating pattern) can thus be optimized or associated. If, over a relatively long period of time, a user has preferred operating patterns, the operating element can adjust to these and can assume a function automatically and in advance. A user also knows from the corresponding haptic feedback which is associated with the functions what is being adjusted and can react appropriately in the case of error.

The damping can preferably be set depending on at least one angle of rotation, detected by means of the sensor apparatus, of the operating element. The damping is in particular adapted depending on the angle of rotation.

The control apparatus is preferably suited and designed for activating the braking apparatus at least (also) depending on at least one control command. The control apparatus is preferably suited and designed for converting the control command into at least one haptic signal which is perceptible at the operating element. This takes place in particular in such a way that a user can or does receive at least haptic or so-called force feedback as a consequence of an input that has been made and/or during an input. The haptic signal comprises in particular a defined sequence of retarding torques or is designed as such. In particular, a haptic signal is understood to mean a significant (and in particular perceptible) change in the resistance to rotation.

The control command in particular predefines what retarding torque needs to be set for which angle of rotation and/or at which time. The control command can comprise at least one function which describes a torque profile according to the angle of rotation or over time. The control command can contain information about how such a function is to be adapted dynamically.

The control command is preferably supplied by the mobile device and in particular by an application (app) installed on the mobile device or alternatively by a remote server or another mobile device. An application (also referred to as an app) is preferably a program which can be run at least partially on the mobile device. The application can also be installed on a remote computer which sends control commands to the mobile device which are then executed locally. The control command can also be supplied by the control apparatus itself. The control apparatus and/or the mobile device can in particular generate a large number of different control commands or select a control command from a large number of stored control commands in a targeted fashion.

The input apparatus can preferably be coupled to the mobile device wirelessly and/or by wired means. In particular, the input apparatus can be coupled in such a way that the mobile device held in the sleeve part can be operated with the input apparatus and/or that the mobile device can transmit signals and in particular at least one control command to the input apparatus. The mobile device and the input apparatus are in particular actively connected. In particular, two-way 2 communication between the mobile device and the input apparatus is provided. In particular, the sleeve apparatus comprises at least one coupling apparatus. The coupling apparatus can comprise, for example, a Bluetooth unit, Ant+unit, ZigBee unit, WLAN unit, and/or a different data transfer unit.

In a particularly advantageous embodiment, the sleeve apparatus comprises at least one electrical energy store and, for example, a battery. In particular, the input apparatus can be supplied with electrical energy by the energy store.

The energy store is preferably fastened on and/or in the sleeve part and preferably integrated. It is also possible and advantageous that the input apparatus can be supplied with energy by an energy store of the mobile device and, for example, its battery (also, for example, wirelessly, inductively, etc). In particular, at least the braking apparatus and/or the control apparatus and/or the sensor apparatus can be supplied with energy in this way. In particular, at least one coil unit or coil apparatus of the braking apparatus is supplied with power via such an energy store.

It is possible and advantageous that the electrical energy store of the sleeve apparatus is suited and designed for charging the energy store of the mobile device. In particular, the sleeve apparatus has at least one extra battery for the mobile device which can be held in the sleeve part.

The sleeve apparatus preferably comprises at least one sleeve part with an arrangement of the input apparatus which is optimized for right-handed people. The sleeve apparatus (also) comprises at least one sleeve part for an arrangement of the input apparatus which is optimized for left-handed people. In particular, the input apparatus is here arranged in such a way that, when the sleeve apparatus is being used properly, it can be reached better with either the right hand or with the left hand. If operation with the thumb is envisaged, the input apparatus is arranged on the sleeve part, for example, on the left-hand side for left-handed people and on the right-hand side for right-handed people.

In a particularly advantageous development, the sleeve part comprises at least two holding apparatuses for holding in each case one input apparatus. The input apparatus can here preferably be inserted selectively into one of the holding apparatuses. This offers particularly simple and convenient adaptation to functions, apps, and the handedness of the user. Thus, for example, by selecting the holding apparatus, an arrangement of the input apparatus which is optimized for right-handed people or for left-handed people can be effected. It is also possible that in each case one input apparatus is inserted into two holding apparatuses. Retrofitting an input apparatus to a second and/or third and/or fourth holding apparatus is also possible.

The sleeve part can also comprise at least three or at least four or more holding apparatuses. In particular, the sleeve apparatus comprises at least one input apparatus which can be removed from the sleeve part and reused. In particular, the removal and/or insertion is configured so that it is performed without tools. In particular, an at least partially automatic coupling of the input apparatus to an energy store and/or to the mobile device is effected by the insertion and/or at least after the insertion into the holding apparatus. The supply of electrical energy is preferably supplied at least partially automatically by insertion of the input apparatus into the holding apparatus.

The operating element preferably comprises at least two actuating zones and particularly preferably at least three or at least four or at least five or more actuating zones.

In particular, the movement of the operating element can be damped in a targeted fashion at least depending on in which actuating zone the operating element is actuated and in particular touched. A large number of operating options which are at the same time intuitive can thus be implemented in a particularly compact fashion and at the same time in a structurally uncomplex fashion.

In particular, the actuating zones can only be moved and preferably rotated jointly. In particular, the actuating zones cannot be moved independently of one another. In particular, the actuating zones are mounted so that they can rotate about a common axis. In particular, the actuating zones are connected to one another so that they are fixed (in rotation). In particular, at least one common braking apparatus is provided for the actuating zones. In particular, the actuating zones are arranged axially directly or indirectly next to one another. The axial arrangement relates in particular to an axis of rotation and/or longitudinal axis of the operating element and/or the braking apparatus. For example, the operating element is designed as a (cylindrical) operating roller and the actuating zones are supplied by axial portions of such a body.

The actuating zones can preferably be distinguished haptically and/or optically (for example, by different illumination). The actuating zones can also be made from glass, Plexiglas, transparent, or semitransparent materials and/or be illuminated from inside or outside. In particular, the actuating zones have at least in some places a different surface and/or surface structure and/or geometry and/or color and/or material and/or size. For example, the actuating zones have a different roughness and/or diameter and/or outer contour. For example, the actuating zones differ in their color and/or illumination.

It is possible and advantageous that at least one (specific) haptic feedback takes place depending on in which actuating zone the operating element is actuated and in particular touched. In particular, the control apparatus is suited and designed for implementing a haptic signal depending on at which of the actuating zones actuation or touch takes place.

For example, a different sequence of retarding torques and, for example, different ripples is set depending on the actuating zone 7 actuated. (A ripple is a (strongly) alternating torque (low/high) at time or angular intervals). It can also be provided that a different number of detent points or stops is set for the actuating zones.

The actuating zones are preferably suited and designed for operating in each case at least one specific function of the mobile device such that a different function of the mobile device can be activated depending on the actuating zone which is actuated. In particular, at least one device function is in each case associated with the actuating zones. In particular, in each case at least one other device function can be operated by selecting the actuating zone. For example, three different device functions can thus be activated intuitively and conveniently via just a single operating element.

It is likewise preferred and advantageous that the actuating zones can be activated and in particular also deactivated in each case by touch and/or pressure. For example, a rotational movement of the operating element is associated with that actuating zone which was previously touched and/or pushed at least once. It is possible that detection, in particular measurement, of pressure intensity takes place in order to do this. In particular, the actuating zones can be activated depending on the pressure intensity. In particular, in each case at least one pressure sensor is associated with the actuating zones.

It is possible in all embodiments of the invention that the pressure intensity on the operating element and in particular on a specific actuating zone is also detected and taken into account for the input. For example, in the case of just light pressure, an input begins or a function is selected and/or started. Firmer pressure can be provided, for example, in order to confirm or execute a command. In particular, the haptic feedback changes depending on the function chosen. This has the advantage that the user can identify what he has chosen and what he is setting.

In an advantageous development, the operating element is designed as a rocker. In particular, the operating element comprises at least one rocker bearing. In particular, the rocker bearing is arranged between at least two actuating zones. In particular, the operating element can be tilted to both sides of the rocker bearing in order to carry out an input. In particular, a specific input and/or specific haptic feedback takes place depending on the actuating zone which is pushed or pulled. Damping by means of the braking apparatus can here be provided or not provided for the pushing and/or pulling. In particular, the rocker bearing has a pivot axis which is arranged transversely to the axis of rotation of the operating element.

In particular, the sleeve apparatus comprises at least one monitoring apparatus. In particular, the monitoring apparatus is suited and designed for detecting by sensors in which actuating zone actuation takes place. The monitoring apparatus comprises in particular at least one image recognition and/or proximity sensor and/or at least one touch sensor and/or radar sensor and/or at least one camera apparatus and/or at least one capacitive sensor. In particular, in each case at least one sensor of the monitoring apparatus is associated with the actuating zones.

In a particularly advantageous development, a first input can be executed by at least a first movement of the operating element. In particular, at least one further input can be executed by moving the operating element further. In particular, a different damping is provided for the first movement than for the further movement. At least one targeted increase in the retarding torque preferably takes place after the first movement such that additional force needs to be expended for the further movement.

The first movement comprises in particular rotation by a defined angle of rotation. In particular, a temporary increase in the retarding torque is provided. In particular, a certain angular range must be passed before it becomes possible again to rotate more easily. The temporary increase can comprise a defined time and/or a defined angular range. It is possible that the retarding torque is permanently increased or reduced. The increased or reduced total retardation can rise or decrease further over time and/or according to the angle. The term permanently relates here in particular to the duration of an operation that is executed. The further movement comprises in particular rotation by a defined angle of rotation.

At least one function is preferably started by the first movement of the operating element. At least one adaptation of the function preferably takes place by the further movement of the operating element. At least one further function can also be started by the further movement. For example, playing media or answering a call or starting a camera function is, for example, executed by the first movement. For example, regulation of the volume of the playback or the call or triggering of the camera or selecting the type of recording then takes place by the further movement.

The control apparatus is preferably suited and designed for supplying at least one haptic signal which is perceptible at the operating element and serves as an aid for people with an impairment. For example, to do this, a Morse code is generated from retarding torques. It is also possible that a different suitable code is generated from retarding torques. For example, higher and lower retarding torques are put in a targeted sequence for such a code. The aid is intended for people with impaired vision and/or hearing. It is possible that the signal can be started and/or repeated by actuation of the operating element. For example, the signal is started by pushing or rotating once. By continuing to rotate the operating element, the signal can then be perceived haptically, for example with the finger or thumb. For example, the signal describes a currently selected function of the mobile device or the battery level or a selected telephone number or other functions where information usually needs to be detected visually.

It is possible and advantageous that zooming and/or scrolling and/or selecting the camera and/or controlling a call, for example answering a call and/or ending a call, and/or selecting a menu can be executed by at least one movement, in particular rotation, of the operating element. Other functions can preferably also be executed by moving the operating element. Particularly preferably, functions can be executed by rotating the operating element which are otherwise operated by rotating a wheel or circular bar simulated on the screen. Thus, for example, an alarm can be set or a date selected in the calendar by rotating the operating element.

It is advantageous and preferred that at least one highlighting, for example enlargement, of a display region can be moved on in a targeted fashion by at least one movement, in particular rotation, of the operating element and preferably skips ahead. The highlighting of the display region preferably skips in the reading direction from one piece of text, for example a line, to the following piece of text, for example the next line. The highlighting can preferably be activated by pushing and/or rotating the operating element at least once. Such an embodiment enables so-called intelligent reading.

It is possible and advantageous that the sleeve part has a foldable design. For this purpose, the sleeve part comprises at least two sleeve sections. The sleeve sections are movably connected to each other by at least one hinge apparatus. The input apparatus is preferably integrated into the hinge apparatus. In particular, at least one sleeve section is designed here to hold the mobile device. This ensures that the mobile device is accommodated securely. In addition, such a design is particularly compact because the input apparatus and the hinge apparatus share the structural space.

In particular, operation via the input apparatus is provided at least in the unfolded state. Operation via the input apparatus is preferably also provided in the folded-up state.

The mobile device can thus be carried in a jacket pocket with a folded-up sleeve part and the volume, for example of headphones, is adjusted via the input apparatus. It is possible that the input apparatus is activated automatically as soon as the sleeve part is unfolded.

The input apparatus or the braking apparatus comprises in particular an axis of rotation about which the operating element can rotate. In particular, the hinge apparatus comprises an axis of rotation about which the sleeve sections can pivot. The axis of rotation of the input apparatus preferably corresponds here to the axis of rotation of the hinge apparatus or is parallel thereto. In particular, the operating element can rotate about the axis of rotation of the hinge apparatus.

The control apparatus is preferably suited and designed for identifying using sensors whether a movement of the operating element is caused by actuation or by folding of the hinge apparatus. The monitoring apparatus is, for example, provided for this purpose.

The ability of the hinge apparatus to move can preferably be damped in a targeted fashion at least partially by means of the braking apparatus. In particular, the hinge apparatus can be fixed in at least one pivoted position. The hinge apparatus can preferably be locked and/or fixed in the unfolded state and/or in the folded-together state. Fixing is understood to mean in particular that the retarding torque is sufficiently high that further movement of the hinge apparatus is possible only by an increased exertion of force.

The ability of the hinge apparatus to move can also be locked in a targeted fashion by the braking apparatus. Locking is understood to mean in particular a sufficiently high retarding torque that no movement of the hinge apparatus is possible with the manual forces that are to be expected during normal operation. In particular, only different actuation of the operating element then has to take place in order to cancel the locking.

It is preferably possible to predefine by means of at least one user setting at which position the hinge apparatus is fixed and/or locked. As a result, the user can fix the sleeve part in a specific position such that he can, for example, read better or watch videos. Two or more detent points can preferably be set by at least one user setting. A specific pivoted position or a specific angle of rotation, and a specific retarding torque, are here associated with a detent point. If, for example, an unfolded smart device is used for a video call, an angle can be set and fixed. Such a detent point must be overcome in particular by an increased exertion of force. Locking of the ability to move can also be provided at such a detent point. The unfolded display can thus also be operated during, for example, the video call without it folding up because it has been touched.

It is also possible that the ability of the hinge apparatus to move is damped by means of a correspondingly high-frequency sequence of different retarding torques. As a result, vibration or shaking is, for example, possible when the sleeve part is unfolded or folded shut.

A further sleeve apparatus according to the invention is provided for a mobile device and particularly preferably for a foldable mobile device. For example, the sleeve apparatus is provided for a foldable smartphone or foldable tablet or a different type of foldable handheld or smart device. The sleeve apparatus comprises at least one sleeve part for surrounding the mobile device at least in some places. The sleeve part has a foldable design. For this purpose, the sleeve part comprises at least two sleeve sections which are connected movably by at least one hinge apparatus. The hinge apparatus here comprises at least one braking apparatus. The braking apparatus is suited and designed for damping the movement of the sleeve sections relative to each other in a targeted fashion.

This sleeve apparatus also particularly advantageously achieves the object. The operation of a mobile device which can be held in the sleeve part can be considerably improved and made more convenient by the targeted damping of the sleeve sections. The sleeve apparatus and/or hinge apparatus and/or braking apparatus are in particular designed at least partially as was described in the context of the sleeve apparatus presented above.

The braking apparatus particularly preferably has a magnetorheological design and/or comprises at least one magnetorheological braking apparatus and can be configured and developed as described above.

The hinge apparatus and/or the braking apparatus preferably projects on just one side or on no side of the folded-together sleeve part over its width and/or height and/or length. The hinge apparatus and/or the braking apparatus can also project on only two sides or only three sides in this way. The hinge apparatus and/or the braking apparatus preferably has a maximum diameter and/or a maximum height and/or width which is the same as or less than the thickness of the folded-together sleeve part. This enables a particularly compact and readily transportable sleeve apparatus. The hinge apparatus can protrude beyond the periphery of the sleeve part at least in some places. The hinge apparatus can be arranged inside the periphery of the sleeve part.

In particular, a targeted retarding torque can be applied to the movement of the sleeve sections such that the sleeve sections can be fixed and/or locked in the closed state and/or in the open state and/or at any opening angle. A control apparatus, by means of which the braking apparatus can be activated, is preferably associated with the hinge apparatus in order to set a targeted damping for the movement of the sleeve sections. In particular, the control apparatus is suited and designed for executing the functions which have been described in the context of the sleeve apparatus presented above.

In particular, the magnetorheological braking apparatus is integrated into the hinge apparatus. In particular, the axis of rotation of the braking apparatus corresponds to the axis of rotation of the hinge apparatus and/or is parallel thereto. The axes of rotation can also be identical. In particular, the axes of rotation are also arranged on a common straight line.

The mobile device according to the invention is in particular a smartphone or a tablet or a different type of handheld or mobile smart device. The mobile device comprises at least one device body. The mobile device comprises at least one input apparatus for activating device functions. The input apparatus here comprises at least one movable operating element and at least one braking apparatus. At least one movement of the operating element can here preferably be damped by means of the braking apparatus in a targeted fashion. The majority of the input apparatus is preferably arranged inside the device body.

Such a mobile device particularly advantageously achieves the object set above. As well as considerably more convenient operation, it also offers a particularly compact structure.

The braking apparatus particularly preferably has a magnetorheological design and/or comprises at least one magnetorheological braking apparatus. A or the magnetorheological braking apparatus comprises at least one magnetorheological medium and at least one field-generating apparatus for generating and controlling a magnetic and/or electrical field strength. The rheological (in particular the magnetorheological) medium can preferably be influenced by means of the or a field-generating apparatus in order to set the torque for the rotatability of the operating element. A magnetorheological braking apparatus offers a particularly large number of advantages.

Arrangement inside the device body is understood according to the invention to mean that something is held inside a space bordered at least partially by the device body. More than 50% and preferably more than 65% and particularly preferably more than 75% of the input apparatus is preferably arranged inside the device body. In particular, only part of the operating element projects from the device body. The majority and in particular at least 50% of the operating element is preferably arranged, with reference to its cross-sectional area, inside the device body.

It is preferred that the operating element can rotate about at least one axis of rotation. The axis of rotation is here preferably arranged inside the device body. In particular, the axis of rotation does not project from the device body.

In particular, the operating element has a periphery, more than half of which is arranged in the device body. It is particularly preferred that a diameter of the operating element, in particular an operating roller, is less than a minimal thickness of the device body.

The input apparatus of the mobile device is preferably designed at least partially in the same way as the input apparatus described in the context of the sleeve apparatus.

In an advantageous development of the mobile device, the operating element comprises at least two actuating zones. In particular, a movement of the operating element can be damped in a targeted fashion depending on in which actuating zone the operating element is actuated and in particular touched.

A further mobile device according to the invention is designed in particular as a smartphone or tablet or a different type of handheld or mobile smart device. The mobile device has an at least partially foldable design. For this purpose, the mobile device, in particular its device body, comprises at least two device parts. The device parts are connected movably by at least one hinge apparatus. The hinge apparatus is here equipped with at least one magnetorheological braking apparatus. The magnetorheological braking apparatus is suited and designed for damping the movement of the device parts relative to each other in a targeted fashion.

Such a mobile device particularly advantageously also achieves the object set above. This mobile device according to the invention can be equipped with an input apparatus. In particular, the input apparatus and/or braking apparatus and/or the hinge apparatus are designed as described above for the other mobile device and/or the sleeve apparatus.

In particular, the input apparatus is integrated into the hinge apparatus. In particular, an axis of rotation of the input apparatus is arranged along an axis of rotation of the hinge apparatus or runs parallel thereto. These axes of rotation can also be identical. In particular, the axes of rotation are arranged on a common straight line.

In particular, the braking apparatus is integrated into the hinge apparatus. In particular, the hinge apparatus of the mobile device has at least one axis of rotation about which the device parts can pivot. In particular, the axis of rotation runs along an axis of rotation of the magnetorheological braking apparatus or is parallel thereto.

The axes of rotation can also be identical. In particular, the axes of rotation are arranged on a common straight line.

The hinge apparatus and/or the braking apparatus preferably projects on just one side or on no side of the folded-together device body over its width and/or height and/or length. The hinge apparatus and/or the braking apparatus can also project on only two sides or only three sides in this way. The hinge apparatus and/or the braking apparatus preferably has a maximum diameter and/or a maximum height and/or width which is the same as or less than the thickness of the folded-together device body. The hinge apparatus can protrude beyond the periphery of the sleeve part at least in some places. The hinge apparatus can be arranged inside the periphery of the device body.

The applicant reserves the right to claim a book rest, in particular for a mobile device, which at least partially has a foldable design and which comprises at least two support sections. The support sections are connected movably by at least one hinge apparatus. The hinge apparatus here comprises at least one magnetorheological braking apparatus which is suited and designed for damping the movement of the support sections relative to each other in a targeted fashion. In particular, the braking apparatus and/or the hinge apparatus are designed as described above for the mobile device and/or the sleeve apparatus. An input apparatus can here also be integrated into the hinge apparatus of the book rest, as was described above.

The input apparatus according to the invention is suited and designed for one of the abovedescribed sleeve apparatuses and/or for one of the abovedescribed mobile devices.

The method according to the invention serves to operate one of the abovedescribed sleeve apparatuses and/or one of the abovedescribed mobile devices.

It is possible that the input apparatus is arranged at least partially on and/or in a support part. The support part is or can be connected in particular to the mobile device and in particular its mobile body. In particular, the support part arranged at least partially and preferably completely inside the device body.

The input apparatus preferably can be and in particular is coupled to the mobile device. In particular, the input apparatus, preferably at least the braking apparatus and/or the control apparatus and/or the sensor apparatus, can be supplied with energy by at least one energy store of the mobile device. In particular, the input apparatus and the mobile device are actively connected.

At least two hinge apparatuses, the axes of rotation of which are arranged in particular on a common straight line, are preferably provided for the sleeve apparatus and/or for the mobile device. Only some of the hinge apparatuses can here have an input apparatus.

It is also possible that the input apparatus is provided separately from the hinge apparatus. It can be provided here that the axes of rotation of the hinge apparatus and the input apparatus lie on a common straight line or are arranged parallel to each other or alternatively run transversely to each other.

The input apparatus can be firmly connected to the sleeve part. The input apparatus can also be connected detachably, and in particular detachably without the use of tools, to the sleeve part. In particular, the input apparatus is integrated into the sleeve part.

In particular, the operating element is designed to be rotatable. In particular, the operating element is mounted so that it can rotate relative to an axle or a different support structure. Such a support structure can be supplied in particular by a first or second braking component of a braking apparatus.

The sleeve part can have, for example, a shell-like design.

For example, the sleeve part encloses the mobile device in the manner of a shell. The sleeve part can be designed for the insertion of the mobile device. In particular, a shell-like sleeve part is provided. Other shapes are also possible.

The input apparatus is arranged in particular on the side of the sleeve part. The input apparatus is arranged in particular on a side which extends between a front side and a rear side of the sleeve part. In particular, the input apparatus is arranged on the left or right side or at the top or bottom. Two or more input apparatuses can also be arranged on one or more sides. An arrangement of the input apparatus on a front side and/or rear side of the sleeve part is also possible.

The control apparatus is in particular suited and designed for, depending on the control command, applying a rotational movement of the operating element in one and/or both directions of rotation and/or over a specific angle of rotation and/or at a specific rotational speed and/or with a specific actuating force with at least one specific retarding torque. As a result, the rotational movement can be retarded and/or locked and/or released in a targeted fashion.

In particular, the control apparatus is suited and designed for, depending on the control command, damping a rotational movement of the operating element in a manner that changes and/or is continuous over time and/or according to the angle of rotation.

In all embodiments, it is particularly preferred that the operating element is designed so that it is at least rotatable in order to activate the mobile device. In particular, at least the rotational movement of the operating element can be damped by means of the magnetorheological braking apparatus in a targeted fashion.

It is preferred and advantageous that, in addition to its ability to rotate, the operating element can also be pushed and/or pulled in order to activate the mobile device. The rotational movement can then preferably be damped by means of the braking apparatus in a targeted fashion. The pushing and/or pulling is then preferably designed with no targeted damping.

It is possible that the operating element can be moved and in particular pushed or slid and/or pulled at least linearly (i.e. along its longitudinal axis) in order to activate the mobile device. In particular, in such an embodiment the operating element has at least one push button. In particular at least the linear movement of the operating element can then be damped by means of the magnetorheological braking apparatus in a targeted fashion.

It is also possible that, in addition to the ability to move linearly, the operating element can also be rotated in order to activate the mobile device. The ability to move linearly can then in particular be damped by means of the braking apparatus in a targeted fashion. The rotational movement is then in particular designed with no targeted damping.

It is particularly preferred that the operating element comprises at least one operating roller and preferably at least one finger roller or is designed as such. A finger roller is understood in particular also to be a thumb roller.

The operating roller can in particular rotate about an axis of rotation in order to make an input. The operating roller can be pushed and/or pulled in particular transversely to its axis of rotation in order to make an input. Whilst it is being pushed, the rotation of the operating element (in particular, the operating roller and/or a rotary knob) can be prevented, which makes the pushing more pleasant and more secure because when the, for example, operating roller is pushed, it does not revolve involuntarily (increased torque or locking of the revolving of the operating roller when pushed).

The operating element can also comprise at least one rotary knob and/or at least one push button or be designed in this way. The rotary knob can in particular rotate about an axis of rotation in order to make an input. The rotary knob can be pushed and/or pulled in particular in the direction of its longitudinal axis or axis of rotation in order to make an input. It is also possible that the rotary knob can be pushed and/or pulled transversely to its axis of rotation. The push button is moved in particular along a linear movement axis in order to make an input. The push button can be rotated in particular about a linear movement axis in order to make an input.

In all embodiments, it is particularly preferred that the input apparatus is dimensioned in such a way that accommodation within a structural space of no more than 28 mm and particularly preferably no more than 10 mm in height and/or width and/or diameter can be implemented. In particular, an operating element, preferably an operating roller, is provided which has a diameter of no more than 32 mm and preferably no more than 10 mm. Such requirements can be implemented particularly advantageously with the magnetorheological braking apparatus presented within the scope of the present invention.

In particular, the braking apparatus can be activated by means of the control apparatus in order to implement at least one of the said method steps or functions or functionalities. The said method step or functions or functionalities can preferably also be implemented in combination with one another.

In advantageous embodiments, it is provided that the sensor apparatus comprises a sensor means with at least one sensor (for example, encoder, rotary encoder, Hall effect encoder). The sensor is, for example, an angular sensor and in particular an angle of rotation sensor. An absolute position (for example, absolute value encoder) or a relative position can be detected. The sensor means can detect the angle of the operating element directly or also indirectly via a position of another component and in particular the braking apparatus.

For example, for this purpose, an angular position and/or an angle of rotation of the braking apparatus is detected. The detected angle is preferably supplied to the control apparatus for activating the braking apparatus.

The holding/retarding torque be set at a level such that further movement of the operating element is possible with an increased exertion of force. The retarding torque can, however, be set such that the operating element is locked when normal manual operating forces are exerted. The further movement of the operating element with an increased exertion of force and/or the locking of the operating element can here be effected in at least one or alternatively both directions of rotation.

The control command can be effected independently of an input and/or as feedback to an input made with the mobile device or the input apparatus. In particular, the retarding torque is adapted depending on the control command. At least one actual operating situation and/or at least one situation simulated by means of software can relate to the control command.

In particular, the control apparatus is suited and designed for receiving the control command and then adapting the retarding torque taking the control command into account. In particular, the control apparatus is suited and designed for carrying out the activations described above and/or below of the braking apparatus also at least partially depending on the control command.

The control apparatus is preferably suited and designed for converting the control command into at least one haptic signal (change in force/torque) which is perceptible at the operating element, in particular such that the user can receive haptic feedback (for example, increased force at the human/machine interface) as a consequence of an input made.

In particular, the mobile device can influence the movability or damping of the operating element in a targeted fashion. As a result, haptic (for example, force) feedback can be implemented particularly advantageously. The haptic signal preferably comprises at least one defined sequence of retarding torques. The haptic signal particularly preferably comprises at least one defined sequence of (rapidly) changing retarding torques or forces at the human/machine interface (also referred to as ripples/ticks/detent pattern).

The individual feedback can be assigned by the software in the form of artificial intelligence.

In particular, any number of detent positions which can be implemented with the braking apparatus can be set at any positions within the normal operating range of movement or rotation of the operating element. In particular, the detent positions can be set depending on the angle of rotation and/or time and/or the control command. In particular, the detent positions are defined at least by an angle of rotation and a retarding torque.

The control apparatus is in particular suited and designed for increasing the retarding torque as early as a defined angle of rotation before a detent position is reached and/or decreasing it from a defined angle of rotation after leaving the detent position.

In all embodiments, the retarding torque can be increased and/or decreased constantly or variably (over time and/or according to the angle).

In a particularly advantageous embodiment, the control apparatus is suited and designed for retarding and releasing the movement of the operating element by means of the braking apparatus in a targeted sequence. In order to implement such a sequence, the control apparatus is in particular suited and designed for setting retarding torques of different strengths 14 for retardation and release. Such a sequence (ripple) offers reliably perceptible haptic feedback even under difficult operating conditions and can be implemented particularly readily with the invention.

The sequence is composed in particular of a sequence of relative maximum values with a higher retarding torque and relative minimum values with a lower retarding torque. In particular, an angular spacing of a period of adjacent relative maximum values can be and is set. In particular, the progression of the retarding torque over a period is set depending on a set operating mode. Such a sequence with particularly short intervals can also be referred to as ripples/ticks. In particular, such a sequence of a defined combination of retarding torques is formed as a function of time and/or the angle. The retarding torques for the retardation and/or release are preferably set as a function of time and/or as a function of the angle and/or depending on a control command.

The retarding torques of the sequence are started and/or maintained and/or ended in particular depending on the angle and/or depending on time. Changing such dependencies within a sequence can preferably also be provided. For example, the sequence is started depending on the angle or depending on time and the length of the sequence is then set depending on time or depending on the angle.

The control apparatus is preferably suited and designed for starting the retarding torques of the sequence depending on the angle and maintaining them depending on time. In particular, the control apparatus is suited and designed for 9 skipping a setting of a retarding torque provided in the sequence when an angular position provided for the start (certain angle of rotation of the operating element) is passed over whilst maintaining a retarding torque.

The control apparatus is particularly preferably suited and designed for setting the different retarding torques of the sequence with a targeted frequency and preferably setting it with such a frequency that the movement of the operating element is damped with a targeted vibration. In particular, the frequency is at least 20 Hz and preferably at least 50 Hz.

The control apparatus is in particular suited and designed for dynamically adapting the different retarding torques of the sequence over time and/or according to the angle and/or the speed of movement (angular velocity) of the operating element and/or the number of settings of retarding torques which have already taken place.

The control apparatus is in particular suited and designed for setting a sequence with retarding torques which change in a targeted fashion. In particular, a sine-curve or cosine-curve progression is provided for this purpose. In particular, for this purpose, the progression has a (slight) negative offset. The offset is in particular less than 30% and in particular less than 20% and preferably less than 10%.

In particular, at least two zero crossings per period are provided for the progression. In particular, the braking apparatus is controlled with a sine or cosine signal in particular with a predetermined and in particular settable (slight) offset from the zero point.

It is preferred that the control apparatus is in particular suited and designed for activating the braking apparatus with a control frequency of at least 5 kHz and preferably at least 10 KHz and particularly preferably at least 50 KHz. In particular, the braking apparatus is suited and designed for implementing such a control frequency.

In particular, the control apparatus is suited and designed for damping the braking apparatus in real time. In particular, the braking apparatus is suited and designed for implementing torque time, the retarding in real In particular, the damping can be adapted by means of the control apparatus in real time depending on the angle and/or time and/or a control command and/or a speed of movement or angular velocity of the operating element.

In particular, the braking apparatus is suited and designed for changing the retarding torque by 30% within less than 100 milliseconds. In particular, the retarding torque can be changed by at least 10%, preferably by at least 30%, and particularly preferably by at least 50%, within less than 10 milliseconds. The retarding torque can also be varied by at least 100% or 500% or tenfold or a thousandfold within less than 100 milliseconds.

The magnetorheological braking apparatus is preferably suited and designed for supplying at least 30,000 increments, in particular 30,000 increments/revolution, for a pivot axis of the operating element in particular by means of a sensor, rotary encoder, or incremental encoder. Incremental encoders, for example, deliver a specific number of pulses per revolution or also one so-called zero pulse per revolution.

These can be incremental encoders with UVW signals or absolute encoders. Haptic signals can thus be implemented particularly effectively. In particular, the increments can be used to supply the abovedescribed feedback and sequences. In particular, at least 30,000 increments can be supplied per revolution of the braking apparatus. In particular, the sensor means can comprise at least 30,000 increments per revolution of the braking apparatus. It is preferred and advantageous that the braking apparatus is designed as a magnetorheological transmission apparatus or at least comprises such an apparatus. It is preferably provided here that the magnetorheological transmission apparatus is equipped with at least two components which can be coupled, the coupling intensity of which can be influenced, wherein at least one channel is provided for influencing the coupling intensity, wherein the channel contains a magnetorheological medium having magnetically polarizable particles, which can be influenced by a magnetic field, and wherein at least one magnetic field-generating apparatus is provided for generating at least one magnetic the in order to influence the 21 field in channel, magnetorheological medium in the channel with the magnetic field, wherein one component as the outer component surrounds the other component as the inner component, and wherein at least one of the two components is mounted via at least one separate bearing, and wherein a spacing between the outer component and the inner component is preferably at least ten times as great as a typical mean diameter of the magnetically polarizable particles in the magnetorheological medium, and the magnetic field of the magnetic field-generating apparatus can be applied at least partially to the channel in order to selectively chain together or release the particles. In particular, the magnetic field-generating apparatus of the transmission apparatus can be activated by the control apparatus in order to set and adapt the retarding torque in a targeted fashion.

The operating element is then associated with one of the couplable components and particular connected non-rotatably thereto.

A magnetorheological transmission apparatus which is particularly advantageously suited for use in the case of the braking apparatus of the invention is described, for example, in DE 10 2010 055 833 A1 and in WO 2012/034697 A1. The entire disclosure of DE 10 2010 055 833 A1 and/or WO 2012/034697 A1 is hereby preferably part of the disclosed content of the present application.

A magnetorheological braking apparatus which is particularly advantageously suited for use in the case of the invention is also described, for example, in DE 10 2018 100 390 A1 and in WO 2019/138015. The entire disclosure of DE 10 2018 100 A1 and WO 2019/138015 is hereby preferably part of the disclosed content of the present application. Such a braking apparatus can also be referred to as a wedge bearing or magnetic field concentrator.

The abovedescribed braking apparatuses can be used particularly advantageously in the case of the input device according to the invention. They can apply and also quickly and if necessary in real time set the required retarding torques and at the same time are compact such that they can be accommodated in the sleeve or the mobile device or the hinge.

The input apparatus of a sleeve apparatus or a mobile device has a magnetorheological braking apparatus which is accommodated on the sleeve apparatus or the mobile device. The magnetorheological braking apparatus has at least two braking components. A first braking component is connected non-rotatably to the sleeve apparatus or the mobile device and extends in an axial direction. The second braking component comprises a rotary part which can rotate about the first braking component and has a hollow (in particular, internally cylindrical) design. A peripheral gap is formed between the first and the second braking component (active gap). The gap is at least partially filled with a magnetorheological medium. The magnetorheological medium here wets the first and the second braking component. The first braking component comprises a core, extending in the axial direction and made from a magnetically conductive 7 material, and (at least) one electric coil. The electric coil 8 is preferably wound about the core in an axial direction and 9 preferably spans a coil plane such that a magnetic field of the electric coil preferably extends transversely (to the axial direction) through the first braking component. A maximum (outer) diameter of the electric coil in a radial direction within the coil plane is here preferably greater than a minimum (outer) diameter of the core in a radial direction transversely (and in particular approximately perpendicularly or perpendicularly) to the coil plane.

The first braking component defines an axial direction. The first braking component can, however, also be designed so that it is angled at least locally to the axial direction. The form of words that the core of the first braking component extends in the axial direction is understood within the sense of the present invention to mean that the core also extends at least essentially in the axial direction. The core can have a profile which is preferably oriented parallel to the axial direction but also can have a slight angle with respect to the axial direction. For example, the core can also be oriented at an angle of 2.5 degrees (') or 5° or 10° or 15° with respect to the axial direction. The winding of the electric coil likewise does not have to be oriented about the core exactly in the axial direction. The electric coil can also be wound about the core at an angle of 5° or 10° or 15°or the like with respect to the axial direction. However, it is in all cases preferred that an angle between the orientation of the core and the axial direction and angle of the winding of the electric coil with respect to the axial direction is less than 20° and in particular less than 10°.

A particular advantage results when the electric coil is wound in the axial direction about at least a significant part of the core or the whole of the core. If a maximum outer diameter of the electric coil in a radial direction within the coil plane is greater than a minimum outer diameter of the core in a radial direction transversely and in particular at least approximately perpendicularly to the coil plane, a greater core diameter can be achieved. A greater core cross-section enables a stronger magnetic field to be generated (higher field strengths in the active gap). As a result, higher braking forces can be generated with the same structural space or alternatively braking forces of the same strength can be generated with less structural space, and the torque which can be obtained per structural volume thus increases. If required, it is also possible to generate still considerable braking forces in a very small structural space. This facilitates use in a sleeve apparatus.

This is a result of the fact that the magnetic field of the electric coil runs transversely to the axial direction of the first braking component (i.e. radially with reference to the longitudinal axis), and that the diameter of the electric coil is increased. The terms damping and retarding can preferably be used synonymously within the scope of the present invention. The control apparatus is here in particular suited and designed for retarding and releasing the movement of the operating element in both directions in a targeted fashion and for locking it in the case of the manual forces that are to be expected during normal operation at the operating element.

In particular, the control apparatus is suited and designed for adapting a retarding torque of the braking apparatus in order to damp the movement in a targeted fashion. In particular, the control apparatus is suited and designed for dynamically setting the retarding torque.

The control apparatus can preferably set any desired retarding torque which can be generated with the braking apparatus for any desired angle of rotation which can be achieved with the operating element and/or for a settable duration. In particular, the control apparatus comprises a plurality of settable operating modes and is preferably suited and designed for associating retarding torque and angle of rotation and/or duration depending on the operating mode.

The control apparatus is in particular an electronic control apparatus. The control apparatus comprises in particular at least one control algorithm. In particular, a retarding torque is set by activating an electric coil apparatus of the braking apparatus with a certain current and/or a certain voltage or a suitable signal.

Releasing the movement is in particular understood to mean within the scope of the present invention that there is just a basic torque, as in normal operation, of the braking apparatus without there being any additionally applied magnetorheological retardation, for example by applying a current to a coil apparatus of the braking apparatus. When the movement is released, the magnetorheological braking apparatus is in particular inactive such that no field is generated in order to actively influence a magnetorheological medium of the braking apparatus.

Further advantages and features of the present invention emerge from the description of the exemplary embodiments which are explained below with reference to the attached drawings, in which:

BRIEF DESCRIPTION OF THE FIGURES

FIGS. 13a-13e show a different braking apparatus;

DETAILED DESCRIPTION OF THE INVENTION

Figure 1:
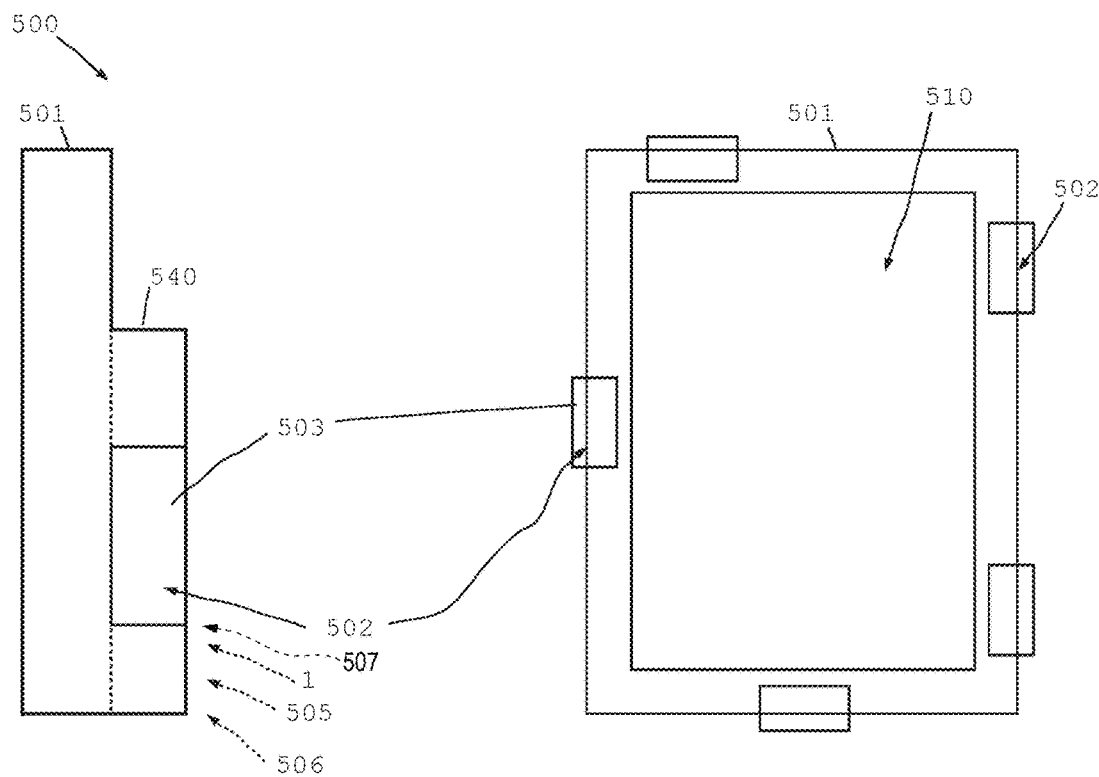
FIGS. 1-5 show purely schematic illustrations of sleeve apparatuses according to the invention.

FIG. 1 shows a sleeve apparatus 500 according to the invention for a mobile device 510 (not illustrated in detail here) and, for example, a smartphone or tablet. The sleeve apparatus 500 here comprises a sleeve part 501 with a shell-like design in which the mobile device 510 can be inserted. The sleeve apparatus 500 is shown in a side view in the left-hand part of the drawing and in a front view in the right-hand part of the drawing.

The sleeve part 501 is here equipped, purely by way of example, with a plurality of input apparatuses 502 for activating the mobile device 510. The number of input devices 502 here serves to illustrate possible positions on the sleeve part 501. The sleeve part 501 can also have just some of the input apparatuses 502 shown here or alternatively just a single input apparatus 502. The input apparatuses 502 are here arranged essentially on the sides of the sleeve part 501 such that, for example, a display of the mobile device 510 remains uncovered.

The sleeve part 501 can be equipped with holding apparatuses 507 which are drawn here by way of example. An input apparatus 502 can in each case be inserted selectively into the holding apparatuses 507, for example in a preferred operating position.

The input apparatuses 502 are here equipped in each case with an operating element 503 designed as an operating roller or finger roller or thumb roller. In order to make an input into the mobile device 510, the operating element 503 can be rotated about an axis of rotation, preferably with a finger or thumb (hence the name finger or thumb roller), The axis of rotation is here arranged inside the sleeve part 501.

An energy store 540 and, for example, a battery here serves to supply energy to the input apparatus 502.

The rotational movement of the operating element 503 is damped in a targeted fashion by means of a magnetorheological braking apparatus which are arranged inside and cannot be seen.

A sensor apparatus 505 and a control apparatus 506, which are likewise arranged inside and cannot be seen, are provided here in order to activate the braking apparatus 1. The sensor apparatus 505 serves to detect an actuating position of the operating element 503 and, for example, its angle of rotation. The control apparatus 506 activates the braking apparatus depending on the detected actuating position.

The braking apparatus 1 and its activation or functionality and its advantageous structure are described in detail below and in particular with reference to FIGS. 9 to 14. The operating elements 503 presented with reference to FIGS. 1 to 8 are here supplied in each case by a second braking component 3 of the braking apparatus 1 according to FIGS. 9 to 14.

Figure 2:
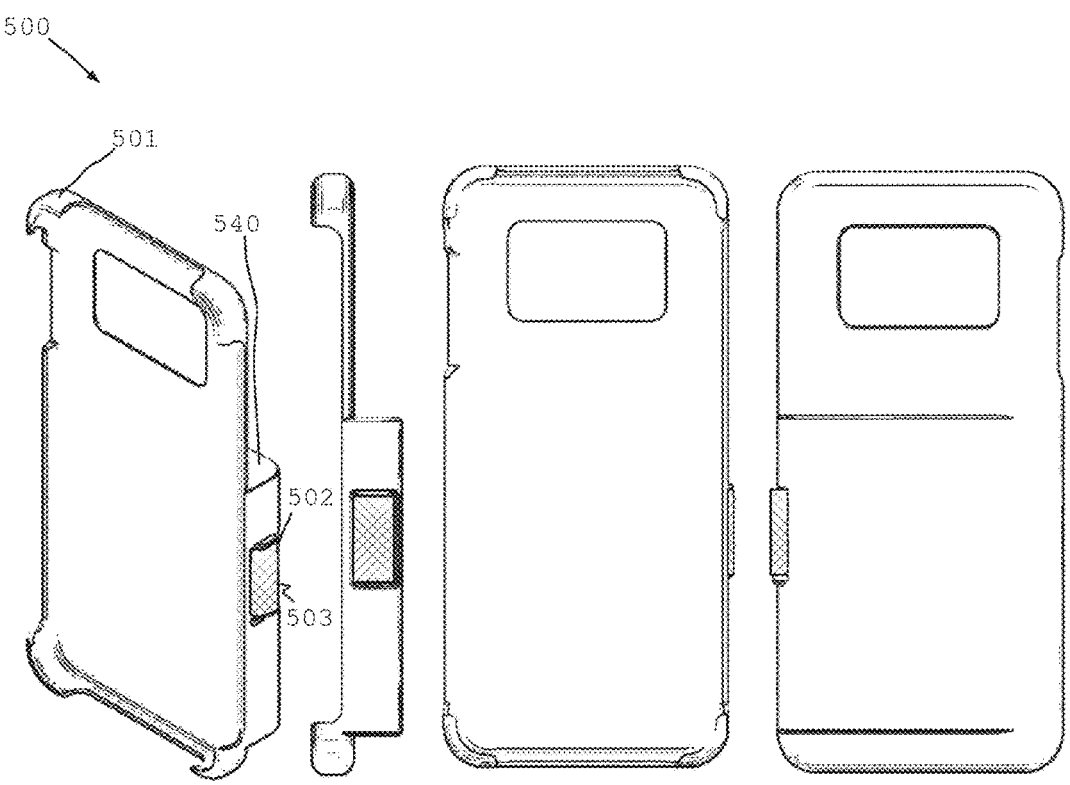

FIG. 2 shows an embodiment of the abovedescribed sleeve apparatus 500 which differs here essentially in the shape of the sleeve part 501 from the abovedescribed sleeve apparatus 500. The sleeve apparatus 500 is here shown (from left to right) in a perspective view obliquely from above, in a side view, in a front view, and in a rear view.

Figure 3:
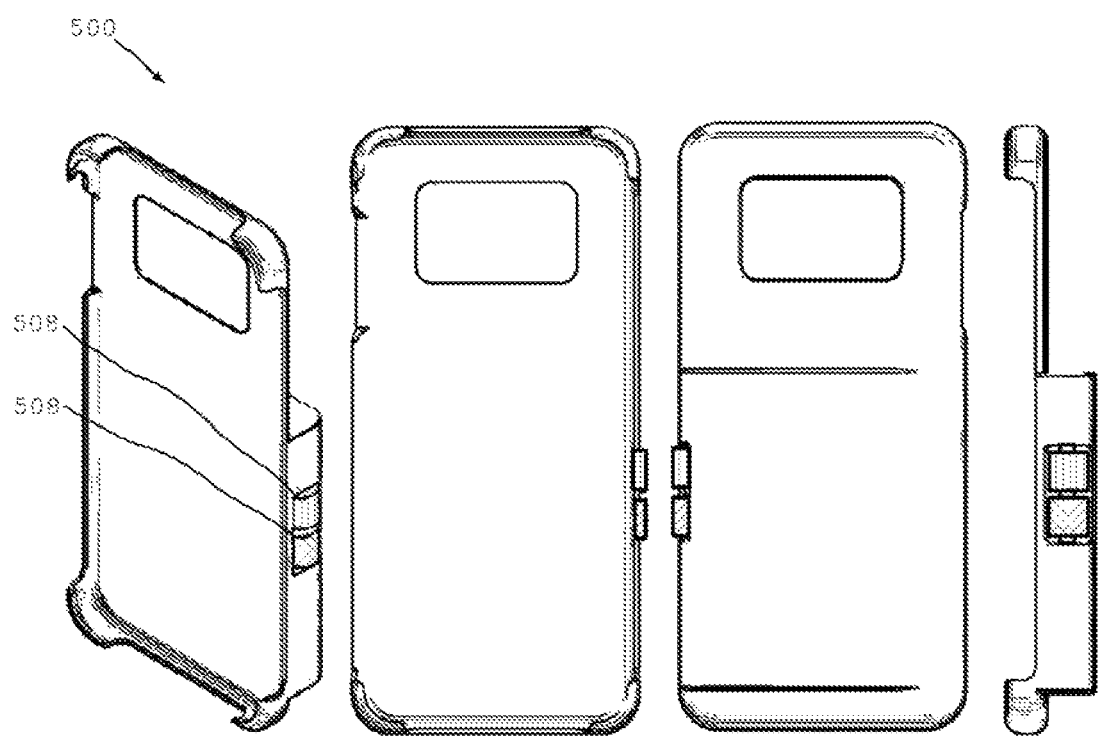

FIG. 3 shows an embodiment of the sleeve apparatus 500 described with reference to FIG. 2. The input apparatus 502 shown here is equipped with an operating element 503 which has two different actuating zones 508. The actuating zones are here arranged axially adjacent to each other. The actuating zones 508 differ here, by way of example, in their surface structure.

The movement of the operating element 503 can be damped here depending on which of the actuating zones 508 is used to make the input. The actuating zones 508 are here joined to a common braking apparatus 1 such that their movement can be damped only jointly or not independently of each other. Depending on at which actuating zone 508 the operating element 503 is rotated, different damping and/or different haptic feedback takes place. The haptic feedback will be described in more detail below. For example, one screen half of the dual display unit (foldable smart device) shown in FIGS. 7 and 8 can be operated with one actuating zone, and the other half can be operated with the other actuating zone. Thus, for example, the content (for example, a Word document or newspaper article) can be scrolled or moved vertically in each display half.

Figure 4:
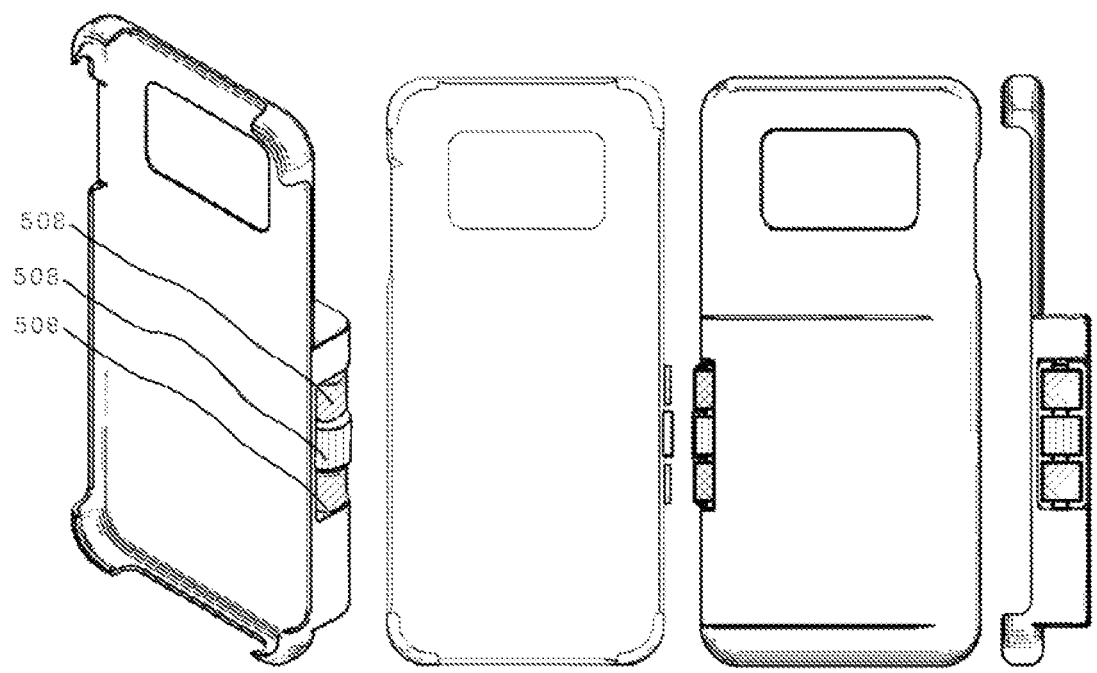

An embodiment of the sleeve apparatus 500 according to FIG. is shown in FIG. 4, in which the operating element 503 has three actuating zones 508. The actuating zones 508 differ here in their surface structure. In addition, the middle actuating zone 508 is provided here with a larger diameter.

Figure 5:
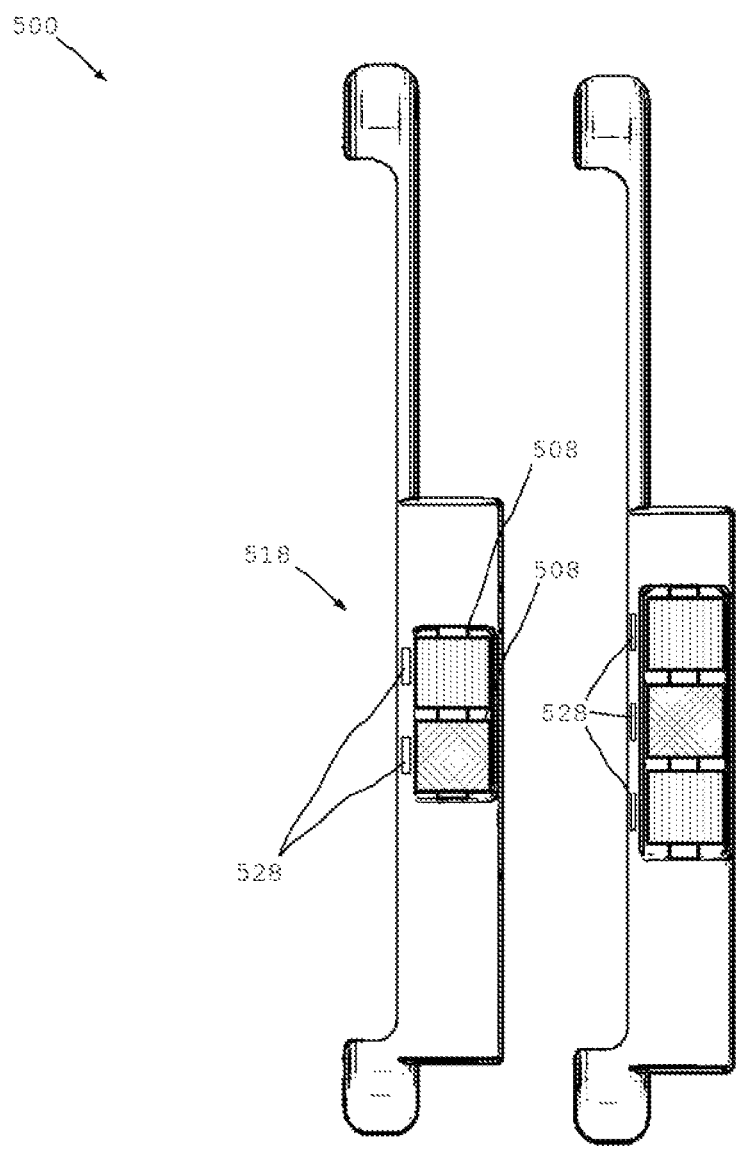

FIG. 5 shows on the left the design of the operating element with two actuating zones 508 according to FIG. 3. On the right is shown the design of the operating element 503 with three actuating zones 508 according to FIG. 4.

A monitoring apparatus 518 is provided for identifying which of the actuating zones 508 is being used or touched. The monitoring apparatus 518 here comprises in each case at least one sensor and, for example, a proximity sensor or image recognition system for the actuating zones 508. It is consequently possible to reliably calculate at which actuating zone 508 the operating element 503 is being touched and rotated.

Figure 6:
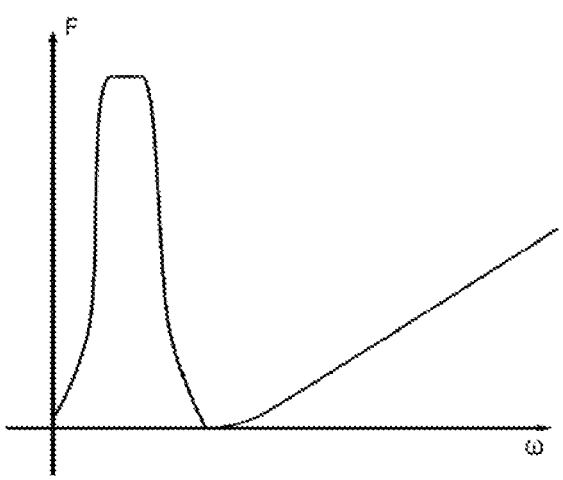
FIG. 6 shows a purely schematic sketch of a progression of a retarding torque according to the angle of rotation.

FIG. 6 shows an advantageous progression of a retarding torque which is set at the operating element 503 by the control apparatus 506 by means of the braking apparatus 1.

The torque progression will be described in more detail below.

Figure 7:
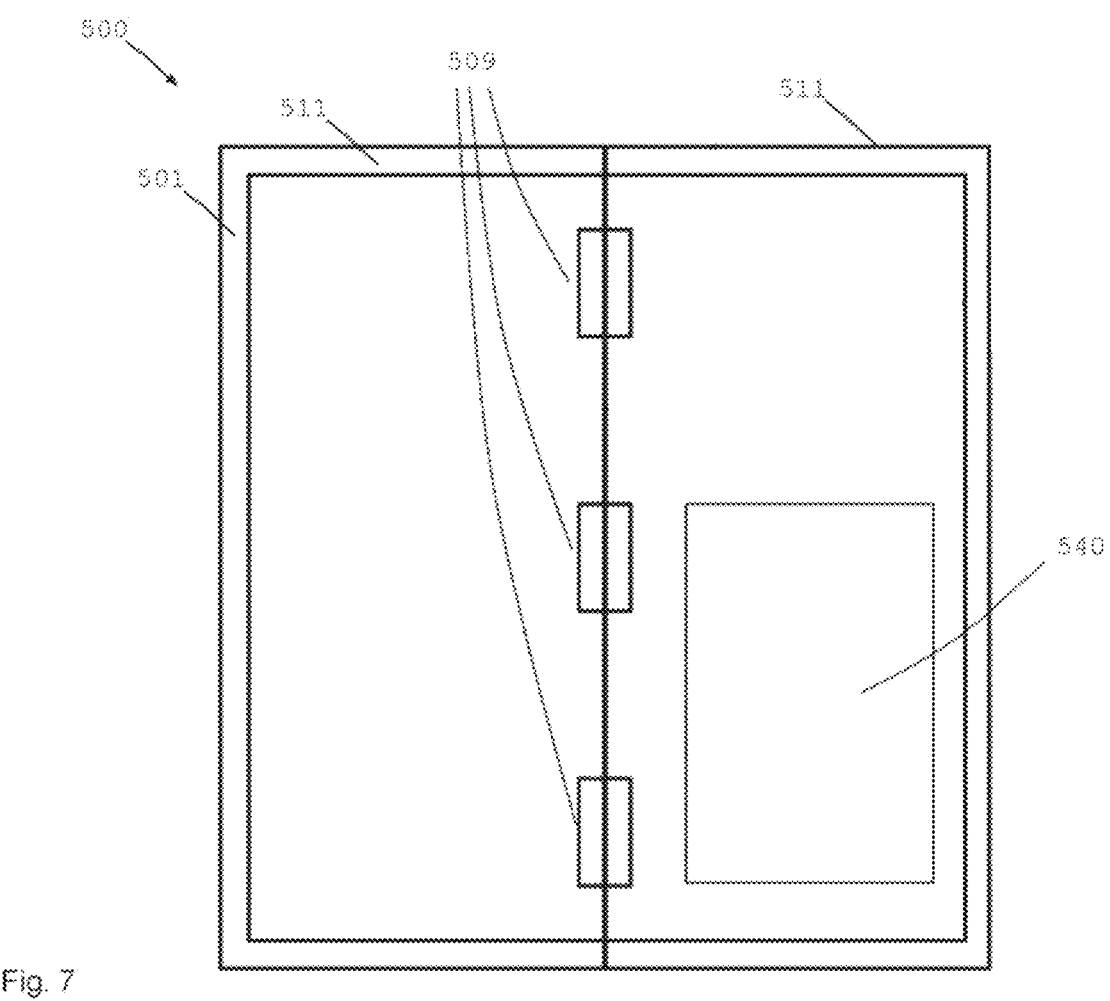
FIG. 7 shows a purely schematic illustration of a further sleeve apparatus according to the invention.

FIG. 7 shows an embodiment of the sleeve apparatus 500 in which the sleeve part 501 has a foldable design. For this purpose, two sleeve sections 501 are here pivotably connected to each other via three hinge apparatuses 509. For example, the hinge apparatuses 509 shown here can each be equipped with a braking apparatus 1 such that the pivoting can be damped or even locked or fixed at certain positions in a targeted fashion.

Some or all of the hinge apparatuses 509 shown here can in each case have one of the abovedescribed input apparatuses 502. The mobile device 510 can consequently be operated from the hinge apparatus 509. It can be provided here that the braking apparatus 1 for the input apparatus 502 at the same time also damps the pivoting movement of the hinge apparatus 509.

Figure 8:
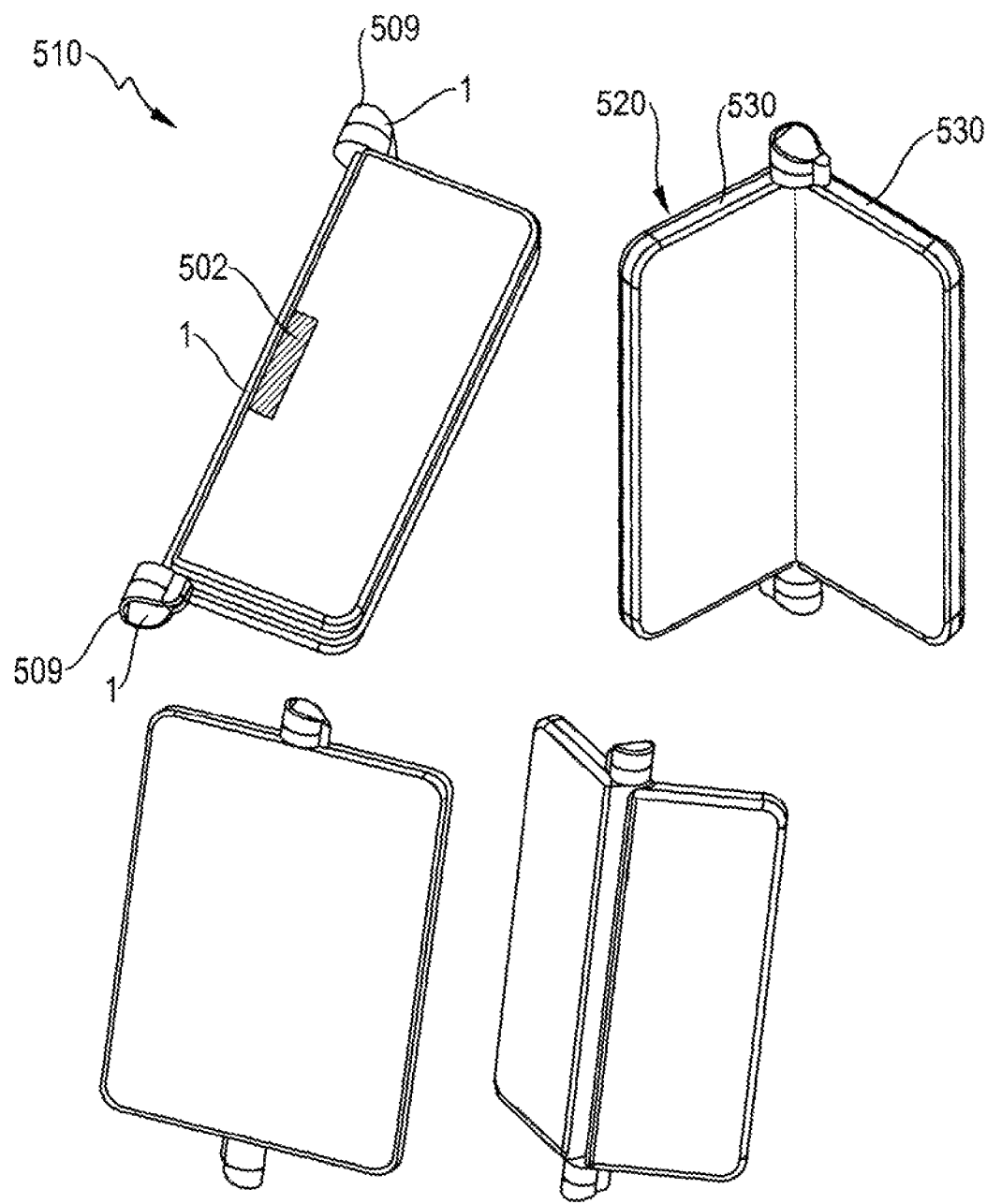
FIG. 8 shows purely schematic illustrations of a mobile device according to the invention.

FIG. 8 shows a mobile device 510 according to the invention which here has a foldable device body 520. In order to fold it, the device body 520 is here divided into two device parts 530 which are here fastened to each other so that they can pivot via two hinge apparatuses 509. The hinge apparatuses 509 are here each equipped with a magnetorheological braking apparatus 1. The pivoting movement can consequently be damped or even locked or fixed at certain positions in a targeted fashion.

Additionally or alternatively, the mobile device 510 can also be equipped with an input apparatus 502 drawn here, as described, for example, with reference to FIGS. 1 to 5. The input apparatus 502 here has an operating element 503 which can rotate about an axis of rotation. The axis of rotation is then arranged completely inside the device body 520.

The braking apparatus 1 will now be presented in detail below.

Figure 9:
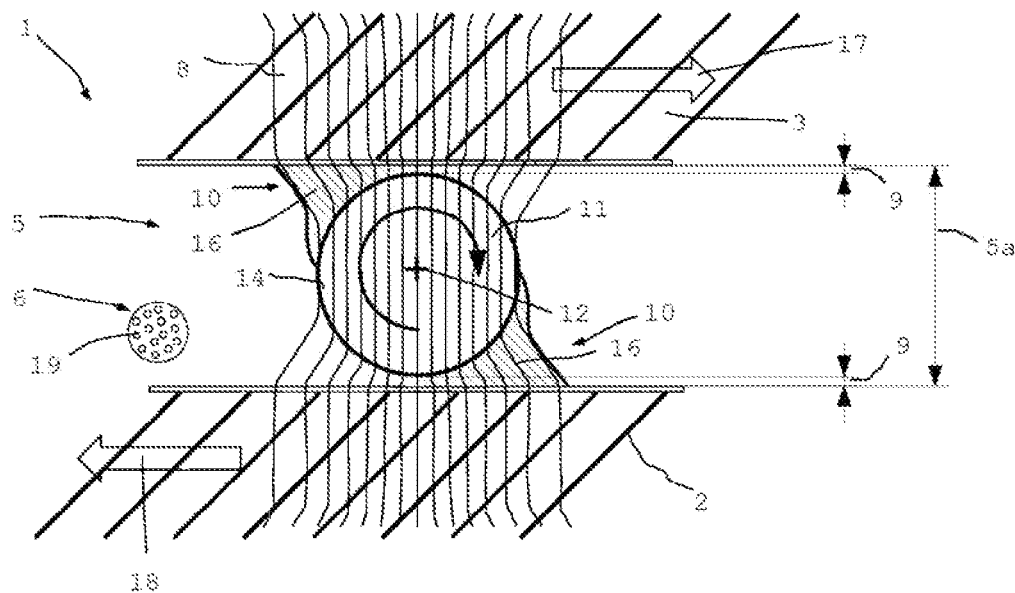
FIG. 9 shows a highly schematic cross-section through a rolling body of a magnetorheological braking apparatus.

FIG. 9 shows a highly schematic view in cross-section of a magnetorheological braking apparatus 1 for a sleeve apparatus 500 for a mobile device 510 such as a cellphone, a smartphone, a tablet, or other types of handheld or mobile smart devices.

The magnetorheological braking apparatus 1 serves to influence the transmission of force between two braking components 2 and 3. A rolling body or rotary body 11 is here arranged between the two braking components 2 and 3 in FIG. 9. The rolling body 11 is here designed as a ball 14. It is, however, also possible to design rolling bodies 11 as cylinders or ellipsoids, rollers, or other revolvable rotary bodies. Rotary bodies which are not actually rotationally symmetrical, such as for example a toothed wheel, or rotary bodies 11 with a specific surface structure can also be used as rolling bodies. The rolling bodies 11 are not used for bearing against one another and instead for transmitting torque.

A channel 5, which is here filled with a medium 6, is provided between the braking components 2 and 3. The medium is here a magnetorheological fluid which, for example, comprises an 9 oil, in which ferromagnetic particles 19 are present, as the carrier liquid. Glycol, grease, water, and viscous substances can also be used as the carrier medium, with no limitation being implied. The carrier medium can also be gaseous or the carrier medium can be omitted altogether (vacuum). In this case, the channel is filled only with particles which can be influenced by the magnetic field.

The ferromagnetic particles 19 are preferably carbonyl iron powder, wherein the size distribution of the particles depends on the specific use case, Specifically, a particle size distribution between one and ten micrometers is preferred, larger particles of twenty, thirty, forty, and fifty micrometers also being possible, however. Depending on the use case, the particle size can also be considerably larger and even enter the millimeters range (particle balls). The particles can also have a specific coating/shell (titanium coating, ceramic shell, carbon shell, etc) so that they can better withstand the high compressive stresses which occur depending on the use case. The magnetorheological particles can be produced for this use case not only from carbonyl iron powder (pure iron) but, for example, also from special iron (harder steel).

The rolling body 11 is preferably set in rotation about its axis of rotation 12 by the relative movement 17 of the two braking components 2 and 3 and in practise runs on the surface of the braking component 3. At the same time, the rolling body 11 runs on the surface of the other braking component 2 such that a relative velocity 18 is present there.

Strictly speaking, the rolling body 11 has no direct contact with the surface of the braking components 2 and/or 3 and therefore does not roll directly thereon. The clearance 9 between the rolling body 11 and one of the surfaces of the braking components 2 or 3 is, for example, 140 μm. In a specific embodiment with particle sizes between 1 μm and 10 μm, the clearance is in particular between 75 μm and 300 μm and particularly preferably between 100 μm and 200 μm.

The clearance 9 is in particular at least ten times the diameter of a typical mean particle diameter. The clearance 9 is preferably at least ten times a largest typical particle. Because of the lack of direct contact, a very low basic friction/force/torque results during the relative movement of the braking components 2 and 3 relative to each other.

If a magnetic field is applied to the magnetorheological braking apparatus 1, the field lines are formed depending on the spacing between the rolling bodies 11 and the braking components 2, 3. The rolling body 11 is made from a ferromagnetic material and, for example, here from ST 37 (8235). Steel type ST 37 has a magnetic permeability ur of approximately 2000. The field lines (magnetic circuit) pass through the rolling body and are concentrated in the rolling body. A high magnetic flux density prevails in the channel 5 at the inlet and outlet surfaces, which are radial here, of the field lines on the rolling body. The field, which is inhomogeneous and strong here, causes a local and strong linking of the magnetically polarized particles 19 (magnetic chaining). By virtue of the movement of the rolling body in the direction of the wedge which is formed in the magnetorheological fluid, the action is significantly increased and the possible braking or coupling torque is greatly enlarged, well beyond the level which can normally be generated in the magnetorheological fluid. Rolling bodies 11 and braking components 2, 3 are preferably at least partially made from ferromagnetic material, for which reason the magnetic flow density is greater, the smaller the spacing between the rotary body 11 and the braking components 2, 3. As a result, an essentially wedge-shaped region 16 is formed in the medium, in which the gradient of the magnetic field increases significantly toward the acute angle at the contact point or the region of the smallest spacing.

Despite the spacing between the rolling body 11 and the braking components 2, 3, the rolling body can be set in rotational movement by virtue of the relative velocity of the surfaces relative to each other. The rotational movement is possible without and also with an acting magnetic field 8.

If the magnetorheological braking apparatus 1 is applied to a magnetic field 8 of an electric coil 26 (not illustrated here in FIG. 9), the individual particles 19 of the magnetorheological fluid 6 are chained together along the field lines of the magnetic field 8. It should be noted that the vectors marked in FIG. 9 represent only in a crudely schematic fashion that region of the field lines which is relevant for influencing the MRF. The field lines enter the channel 5 essentially perpendicularly to the surfaces of the ferromagnetic components and, especially in the acute-angled region 10, do not have to run in a straight line.

At the same time, some material of the magnetorheological fluid is set in rotation on the periphery of the rolling body 11 such that an acute-angled region 10 is formed between the rolling body 11 and the braking component 2. The acute-angled regions 10 can, for example, have a wedge shape 16 in the case of cylindrically configured rolling bodies 11. Further rotation of the rolling body 11 is prevented by the wedge shape 16 such that the action of the magnetic field on the magnetorheological fluid is intensified because the medium situated there coheres more strongly by virtue of the acting magnetic field within the acute-angled region 10. As a result, the action of the magnetorheological fluid is intensified in accumulated clusters (the formation of chains in the fluid and hence the cohesion or the viscosity), which impedes the further rotation or movement of the rotary body 11.

Significantly higher forces or torques can be transmitted by the wedge shape 16 (particle accumulation) than would be possible with a comparable structure which uses only a shearing movement with no wedge effect.

The forces which can be transmitted directly by the applied magnetic field represent only a small part of the forces which can be transmitted by the device. The wedge formation and hence the mechanical force intensification can be controlled by the magnetic field. The magnetorheological effect can be mechanically intensified to the extent that transmission of force is possible even after an applied magnetic field has been disabled, if the particles have been subjected to a wedge effect.

It has been proved that a considerably greater action of a magnetic field 8 of a certain strength is obtained by the wedge action of the acute-angled regions 10. The action can thus be intensified many times over. In one specific case, influence of the relative velocity of two braking components 2 and 3 relative to each other was observed which was approximately ten times greater than in the prior art for MRF couplings using principle in which the shearing a magnetorheological fluid is arranged between surfaces moving relative to each other and is subject to the shearing forces of the surfaces which move relative to each other. The possible intensification caused here by the wedge action depends on different factors. It may be further intensified by a greater surface roughness of the rolling bodies 11. It is also possible that outward protruding projections, which can cause an even more pronounced wedge formation, are provided on the outer surface of the rolling bodies 11.

The wedge action or wedge effect is distributed over the surface of the rolling bodies 11 and the components 2 or 3.

Figure 10:
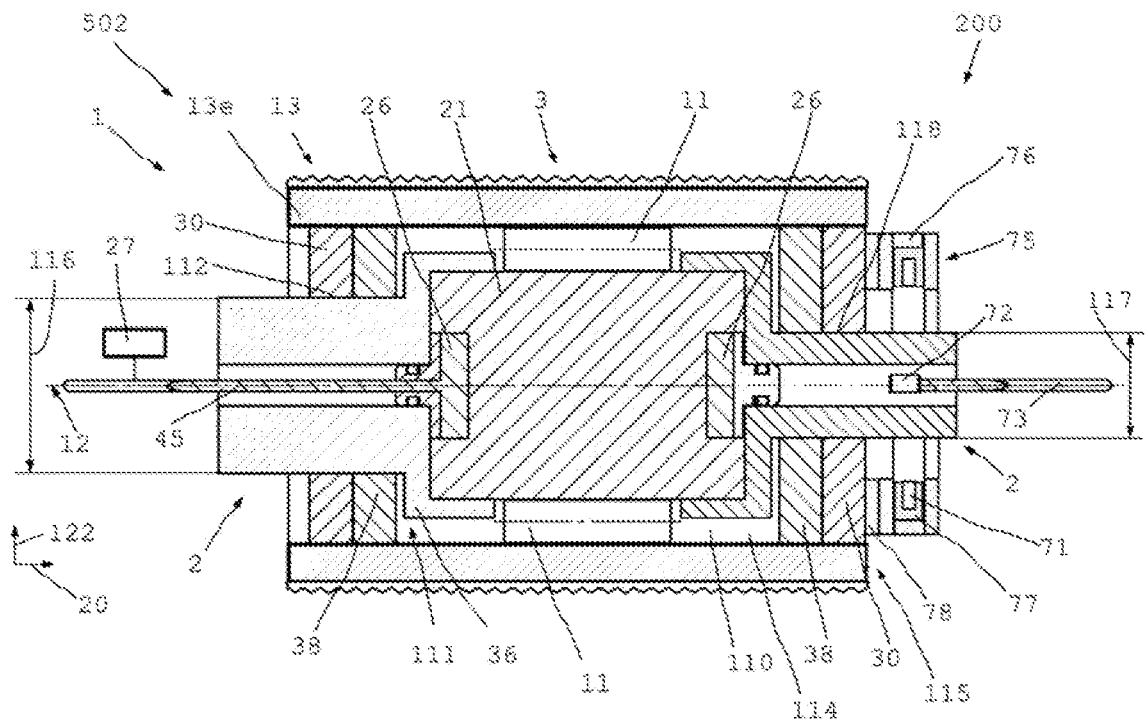
FIG. 10 shows a schematic cross-section through a braking apparatus.

FIG. 10 shows a section through an input apparatus 502 which forms a device component 200. The input apparatus 502 comprises a magnetorheological braking apparatus 1 which has two braking components 2 and 3. The first braking component 2 and the second braking component 3 extend essentially in an axial direction 20. The first braking component 2 is here arranged inside the second braking component 3 and is held positively and/or non-positively by a holder 4. The holder 4 is generally fastened on the sleeve apparatus 500 or on a mobile device 510. The second braking component 3 is received on the first braking component 2 so that it can rotate continuously relative to the latter. The second braking component 2 forms the rotatable operating element 503 which can be operated, for example, by a user's finger.

The second braking component 3 has an elongated design and has the rotary part 13 and a magnetically conductive sleeve part 13e situated therein.

The second braking component 3 is received rotatably on the second braking component 2 at the first bearing location 112 and at the second bearing location 118 and can also be mounted so as to be axially displaceable. At the bearing locations 112, 118, forces in a general radial direction 122 can be supported by the bearings 30, whilst the first braking component 2 can be displaced relatively axially with respect to the second braking component 3. The diameter 116 of the first bearing location 112 is here twice as great as the diameter 117 of the second bearing location 118.

The second braking component 3 is led out at both ends, A closed chamber 110, which is filled with a magnetorheological fluid (MRF), is formed between the braking components 2 and 3. In the region of the first end 111 of the chamber 110, a cylindrical running surface is formed on the holder 4 as a first bearing location 112. A hardened surface or a surface of a corresponding quality is present there. A bearing 37 for rotatable mounting of the second braking component 3 is attached at this cylindrical running surface 37. A seal 38 is provided adjacent to the bearing 30, further inward in the axial direction 20. The seal 38 reliably seals the interior.

The first braking component 2 has a base body 33. The windings of an electric coil 26 are wound about the core 21. The 8 individual windings of the electric coil 26 here project 9 outward beyond the cylindrical base body 33 (cf FIG. 12). A gap 5, which is here designed essentially as a hollow cylindrical gap, is present radially between the outer wall of the first braking component 2 and the inner wall of the sleeve part 13. A plurality of transmission components 11, which are here designed as rolling bodies, are arranged in the gap. The rolling bodies 11 are here designed as cylindrical rolling bodies and have an external diameter which is slightly smaller than the gap width of the gap 5. The gap 5 is furthermore here filled with a magnetorheological medium.

An O-ring or the like, filled with air or a different gas and which provides volume compensation in the event of temperature fluctuations, can, for example, be arranged in a region of the gap. Moreover, a reservoir is formed there as a result, in case magnetorheological fluid or medium escapes from the inside to the outside during operation. The construction is used here to provide, by virtue of the differently sized diameters 116, 117, an automatic temperature compensation and a reservoir for MRF.

The (usable) gap length of the gap 5 is here greater than the length of the rolling bodies 11. Also, the electric coil is designed to be longer in the axial direction 20 than the length of the rolling bodies 11.

The core 21 can be seen inside the electric coil 26. The holder 4 has a radially enlarged receptacle 36 (diameter 36a, cf FIG. 11) for non-rotatably receiving the first braking component 2. A cable bushing extends downward through the holder 4. Cables 45 for connection of the electric coil 26 and possibly sensor lines are led out there. A control apparatus 27 can be provided in the base of the holder 4 or at different locations or be associated therewith in order to carry out a control function as required.

A closed chamber 110 is formed between the first end 111 and the second end 115. The closed chamber 110 comprises the volume 114 which is essentially completely filled with the magnetorheological medium 6.

A change in the volume of the magnetorheological medium here causes a relative axial displacement of the first braking component 2 relative to the second braking component 3 by virtue of the different diameters 116, 117 of the two bearing locations 112, 118.

When the first braking component 2 is stationary, the second braking component 3 is displaced to the right in the orientation of FIG. 3 in the case of an increase in volume.

A small part of the first braking component 2 with the diameter 116 at the first bearing location 112 emerges from the closed chamber 110, whilst a part of the first braking component 2 enters the closed chamber 110 at the second end 115 with the considerably smaller diameter. The net result is that the volume 114 of the closed chamber 110 is thus enlarged. In particular a change in the volume of the magnetorheological medium 6, caused by a rise in temperature, can thus be compensated. A function of the magnetic field-generating apparatus 113 is not influenced by this. In the case of a decrease in volume, which can occur because of the temperature or alternatively because of a leak, the second braking component 3 is here displaced to the left.

In practise, ambient pressure always prevails inside the magnetorheological braking component 1 during the displacement. Above all, additional stress on the seals 38 is thus prevented. In contrast, a reduced pressure is always applied to the interior in the case of a compensation apparatus via a gas bubble, as a result of which higher leakage and higher friction occur as a result of the required better sealing.

A compensation channel 120 can be provided which interconnects the regions close to the bearing locations 112, 118. Thus, when the magnetorheological medium 6 is displaced, the restricting action of the gap is lessened if it is intended that the latter is very small.

Furthermore, the magnetorheological braking apparatus 1 has a sensor apparatus 70 at least for detecting an angular position of the two braking components 2, 3 relative to each other. The detection is effected with a magnetic ring unit 71 and by means of a magnetic field sensor 72, The sensor apparatus 70 is here connected to the braking component 3 via an uncoupling apparatus 78. The uncoupling apparatus 78 magnetically uncouples the sensor apparatus. The sensor apparatus 70 here furthermore comprises a shielding apparatus 75 which here comprises a plurality of shielding bodies 76 and which surrounds the magnetic ring unit 71 on three sides. A separating unit 77 is present between the magnetic ring unit and the shielding apparatus 75. The separating unit 77 additionally shields the magnetic ring unit 71. As a result, the volume spanned by the magnetic ring unit 71 is largely shielded from magnetic influences of the electric coil 26 or other magnetic fields.

Figure 11:
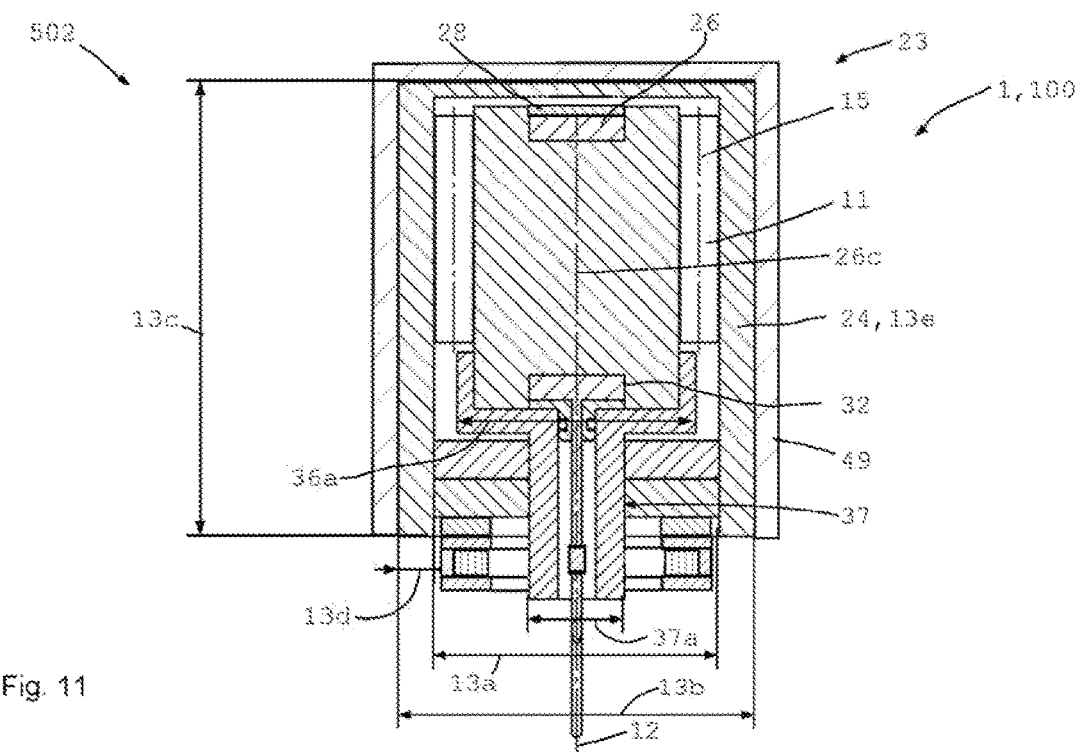
FIG. 11 shows a cross-section of a further braking apparatus.

FIG. 11 shows a different input apparatus 502 in section with a similar magnetorheological braking apparatus 1. The operating element 503 of the input apparatus 502 is either received on one side of the sleeve apparatus 500 or a further axle stub is formed at the second end in order to rotatably mount the operating element 503 of the input apparatus 502.

The transverse grooves 32, in which the electric coil 26 is wound at the axial ends of the core 21, can be seen. Potting compound 28 is in each case provided in the axial direction fox closure at both ends. In the region of the cable bushing 35, a separate seal is provided via, for example, the O-ring or the like which has been indicated.

It is also possible that individual rolling bodies of those arranged distributed over part of the periphery are designed as magnetically nonconductive transmission components. All the rolling bodies are preferably made from magnetically conductive material such as, for example, steel.

A length or height 13c of the rotary part 13 and the sleeve part 13e or the second braking component 3 in the axial direction 20 is preferably between 3 mm and 90 mm and in particular between 5 mm and 30 mm, A cover 49 can be attached to the outside of the second braking component 3 such that the external appearance of the rotary knob 23 is determined essentially by the surface of the cover 49. Different segments can be differentiated by different surfaces.

The material of the sleeve part 13e or the rotary part 13 as a whole is magnetically conductive and serves to close the magnetic circuit. A wall thickness 13d of the sleeve part 13e is preferably at least half as great as a diameter of the rolling bodies 11, The diameter 36a of the receptacle 36 is preferably considerably greater than the diameter 37a of the cylindrical running surface 37. The friction at the seal 38 is consequently reduced. Standardized bearings can moreover be used.

It is also possible for the core 21 and also the holder 4 to have a two-part design. The division preferably runs along the center line shown in FIG. 11, which results in a left and right (core) half. The two core halves can be spaced apart from each other by a magnetically nonconductive element (for example, seal). The volume of the potting compound 28 is preferably then part of the core half or halves, which results in a semicircular element with a peripheral groove on the separating surface for the electric coil. The receptacle 36 is more preferably also divided into two halves. One receptacle half can also form part of one core half (be designed as a single piece), or one core half can be designed as a single piece with a complete receptacle unit 36. The input apparatus 502 is here mounted on one side of the magnetorheological braking apparatus 1. The second braking component 3 is here received just at the first end of the closed chamber 110 at an end section 121 of the first braking component 2, i.e. the second braking component 3 is mounted by the bearing 30 only at the first bearing location 112. The second braking component 3 can move back and forth easily when there is a change in volume inside the closed chamber. It is again assumed here that the first braking component 2 is stationary. In this case, part of the diameter 116 of the first braking component 2 moves out or in at the first bearing location 112. The volume 114 of the closed chamber 110 changes. In practise, the system is always at ambient pressure within the given range of movement. Additional stress on the seal 38 is prevented.

FIGS. 12a to 12d show different schematic cross-sections of the magnetorheological braking apparatus 1 which can be used for the input apparatuses 502 according to FIGS. 10 and 11 and also other exemplary embodiments.

The inner braking component 2 is designed to be stationary and is surrounded by the continuously rotatable braking component 3. The second braking component 3 has a rotary part 13 which can rotate about the first braking component and has a hollow and internally cylindrical design. The peripheral gap 5 between the first and the second braking component 2, 3 can be clearly seen. The gap 5 is here filled at least partially and in particular completely with magnetorheological medium 6.

The first braking component 2 has the core 21, extending in the axial direction and made from a magnetically conductive material, and an electric coil 26 which is wound about the core 21 in the axial direction 20 and spans a coil plane 26c.

The magnetic field 8 of the electric coil 26 extends transversely to the axial direction 20 through the first braking component 2 or the core 21.

It can clearly be seen that a maximum external diameter 26a of the electric coil 26 in a radial direction 26d within the coil plane 26c is greater than a minimum external diameter 21b of the core 21 in a radial direction 25 transversely and, for example, perpendicularly to the coil plane 26c.

The rolling bodies 11 are each arranged just in angular segments 61, 62 and cannot revolve completely about the core 21 because the electric coil 26 projects into the gap 5 or channel and hence prevents a complete revolution.

As a result, less space is available for the rolling bodies 11. However, this causes a higher concentration of the magnetic field 8. Three magnetic field lines have been marked in FIG. 12a by way of example.

Figure 12A:
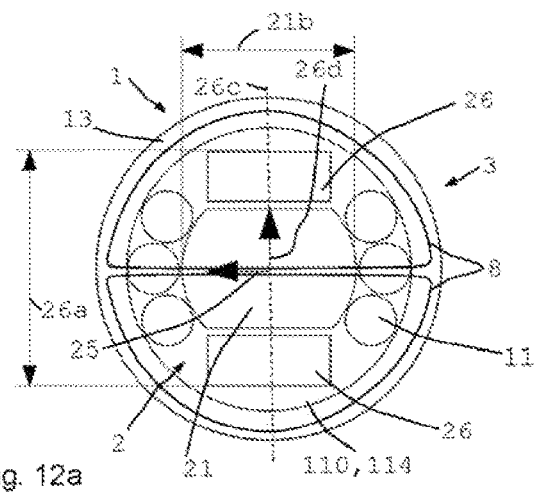
FIGS. 12a-12d show schematic cross-sections of the braking apparatuses according to FIG. 10 or 11.
Figure 12B:
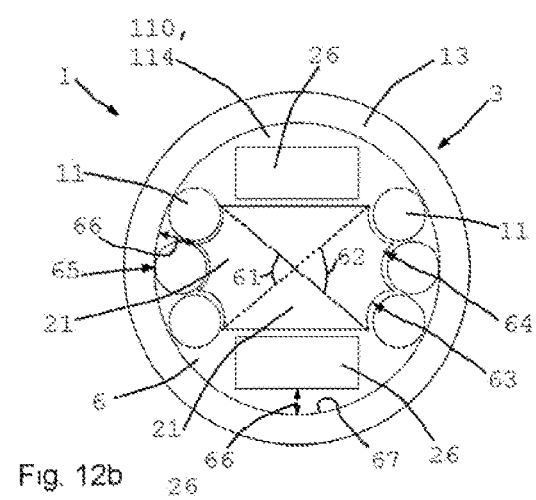

In FIG. 12b, the rolling bodies 11 are not received on a cylindrical outer surface of the core 21 and instead on receptacles 63, specially adapted to the contour of the rolling bodies 11, on which the rolling bodies 11 are preferably received and guided with a little play. It is advantageous that the magnetic field 8 passes into the rolling bodies 11 because there is a greater transmission surface area available between the core 21, or the outer surface 64 at the receptacles 63, and the rolling bodies 11.

The electric coil is arranged outside the angular segments 61 and 62, There are no rolling bodies 11 situated outside the angular segments 61 and 62.

Figure 12C:
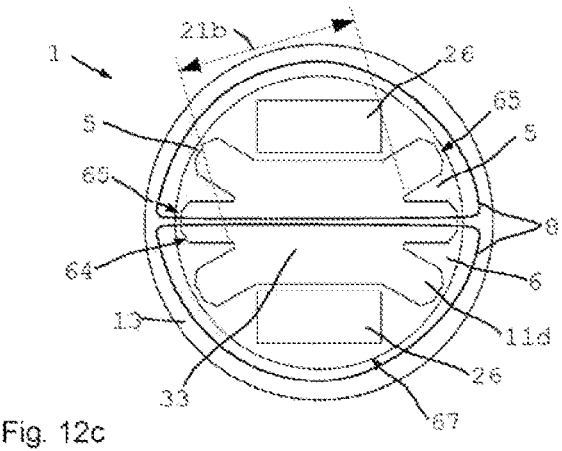
Figure 12D:
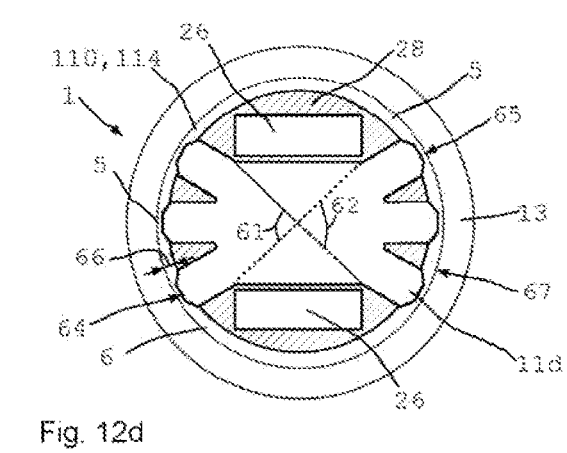

FIGS. 12c and 12d show further developments in which rolling bodies 11 have been omitted altogether. The cores 21 have outward protruding transmission components 11 which extend radially outward from the base body 33. In FIG. 12c, the chamber 110 between the core 21 and the rotary part 13 is completely filled with MRF.

The maximum external diameter 26a of the coil 26 is greater than the minimum core diameter 21b. The radial extent of the gap 5 varies over the periphery. There is only a small gap size 65 at the outer ends of the transmission components 11, whilst a radial spacing 66 between the braking component 2 and the braking component 3 at locations other is considerably larger, FIG. 12d shows a variant of FIG. 12c in which, in order to decrease the volume of MRF, the chamber is filled with potting compound 28 over a cylindrical section. The required volume of MRF is lowered as a result. The radial spacing 66 is considerably decreased but remains significantly larger (at least by a factor of 2 or 3 or 5 or 10) than the radial gap size 65. It is consequently ensured that the described wedge effect occurs. The MRF particles become chained together in the acute-angled regions and form a type of wedge, which results in a significant braking torque. In FIGS. 12c and 12d, the transmission components 11 form kind of radial arms 11d.

FIGS. 13a to 13d show a further embodiment of an input apparatus 502 for a sleeve apparatus 500 or a mobile device 510 which here again has a magnetorheological braking apparatus 1 and comprises braking components 2 and 3. A "horizontal or axial coil" is again used, in which the electric coil 26 is wound in the axial direction 20 about the core 21 and again has a maximum radial core diameter 26a which is greater than a minimum core diameter 21b of the core 21. Here too, the rolling bodies or transmission elements are not arranged over the complete periphery.

The device component 200 is here designed as an input apparatus 502. The second braking component 3 is received at the bearing location 112 at the first end of the closed chamber 110. Moreover, the second braking component 3 is 8 received at the second bearing location 118 on the first braking component 2. The bearing is here implemented at the second bearing location 118 by means of an axle stub 119 with the diameter 117, The sealing ring 46 prevents the magnetorheological medium from flowing into the region behind the axle stub 119.

The diameter 117 at the second bearing location 118 is here designed to be considerably smaller than the diameter 116 at the first bearing location 112. A change in volume is thus made possible here too when there is an axial displacement. Changes in volume caused by the temperature and changes in volume caused by leaks can be compensated. To do this, a relative axial displacement of the first braking component 2 with respect to the second braking component takes place.

Moreover, a sensor apparatus 70 for detecting an angular position of the input apparatus 502 is present here too. The magnetic field sensor 72 is integrated in the stationary receptacle 4 or the first braking component 2, At the receptacle 36, the cable 45 of the magnetic field sensor 72, i.e. the sensor line 72, is led through the cable bushing 35 to the outside.

The first axle part or the holder of the braking component 2 can, as illustrated in FIGS. 13b and 13c, preferably have a two-part design. As a result, especially the fitting of the electrical lines and in particular the sensor line 73 inside the first braking component 2 is simplified. The cables can be laid through the cable bushing 35, The sensor apparatus 70 is shown again in detail in FIG. 13d. The first braking component 2 and the second braking component 3, designed here as a rotary part, are only indicated (dashed lines). The sensor apparatus 70 is supported via the uncoupling apparatus 78 on the rotatable second braking component 3 in a magnetically uncoupled fashion. The shielding apparatus 75 here consists of three shielding bodies 76 which decrease the scattering of the magnetic field 8 of the electric coil 26. Furthermore, another separating unit 77 for magnetic separation is also present. The magnetic ring unit 71 is used to measure the orientation the of angle rotation of the magnetorheological braking apparatus 1. The magnetic field sensor 72 is arranged inside the first braking component 2. Small relative axial displacements can moreover be used in order to detect when, for example, an operating knob 101 is pressed.

FIG. 13e shows a highly schematic view of an operating apparatus 502 in which the inner braking component 2 is designed to be stationary and is surrounded by the rotatable braking component 3. For this purpose, the braking component 3 can have a pin section and a hollow cylindrical section. The pin section can be gripped and rotated whilst the braking function is implemented in the hollow cylindrical section. Such a configuration is possible in all embodiments.

Figure 14A:
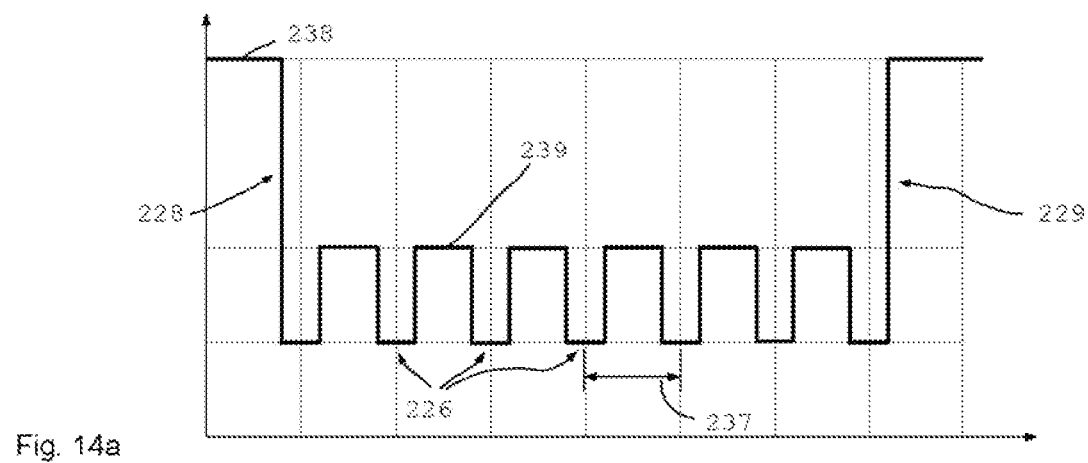
FIGS. 14a-14d show possible torque progressions according to the angle of rotation of a braking apparatus.
Figure 14B:
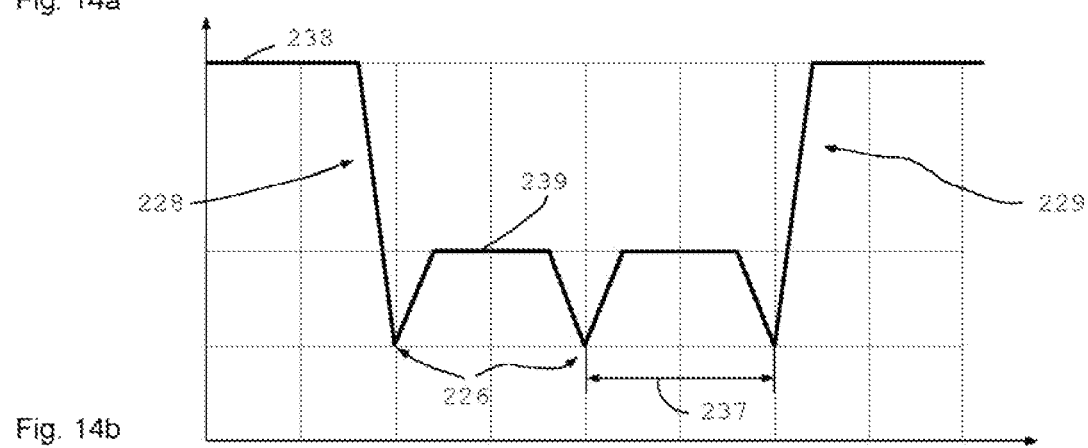

Possible alternative embodiment s for controlling a dynamically generated magnetic field or a dynamically generated braking torque depending on the angle of rotation are illustrated in FIGS. 14a, 14b, and 9c.

FIG. 14a here shows a variant in which the input apparatus 502 is used as a roller and haptic operating aid. The rotational resistance according to the angle of rotation is illustrated. A left-hand end stop 228 and a right-hand end stop 229 can be generated by the control system 27. When the rotary knob 23 is rotated further, a high magnetic field or stop torque 238 is generated, as a result of which the rotary knob 23 encounters a high resistance with respect to rotational movement. The user receives the haptic feedback of an end stop.

A detent pattern of the rotational movement can here result or be generated. This can, for example, be used in order to navigate by means of a graphical menu and select menu items. A first detent point 226, which corresponds during operation, for example, to a first menu item, is provided here directly next to the left-hand end stop 228. If the next menu item is to be selected, the rotary knob 100 must be rotated clockwise. To do this, the dynamically generated higher magnetic field or detent torque 239 or its friction torque must be overcome before the next detent point 226 is reached. In FIG. 14*a*, a respective constant magnetic field, which is considerably lower at the detent points than in the intermediate regions and again lower than at the stops 228, 229, is generated for a certain angular range in each case at the detent points 226 and at the intermediate regions.

An angular spacing 237 between individual detent points can be modified dynamically and is adapted to the number of available detent points or menu items.

FIG. 14*b* shows a variant in which the magnetic field does not increase suddenly toward the end stops 228, 229 and instead assumes a steep progression. Furthermore, ramp-like slopes of the magnetic field are in each case provided at the detent points 226 in both directions of rotation, as a result of which the rotational resistance increases in the corresponding directions of rotation. Only three detent points 226, the angular spacing 237 of which is greater than in the example according to FIG. 14*a*, are made available here with the same input apparatus 502.

Figure 14C:
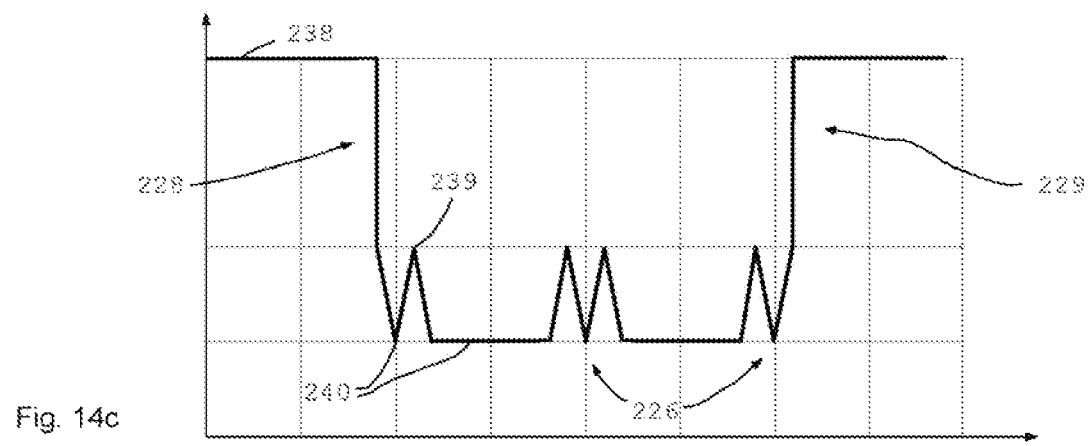

FIG. 14*c* shows a variant in which a smaller rotational resistance is present between individual detent points 226 and an increased magnetic field 239 is generated in each case only directly adjacent to the detent points 226 in order to enable engagement at the individual detent points 226 and at the same time to make only a small rotational resistance available between individual detent points.

In principle, a combination of the operating modes and the magnetic field progressions in FIGS. 14*a*, 14*b*, and 14*c* is also possible. For example, in the case of different submenus, a correspondingly different setting of the magnetic field progression can be effected.

Figure 14D:
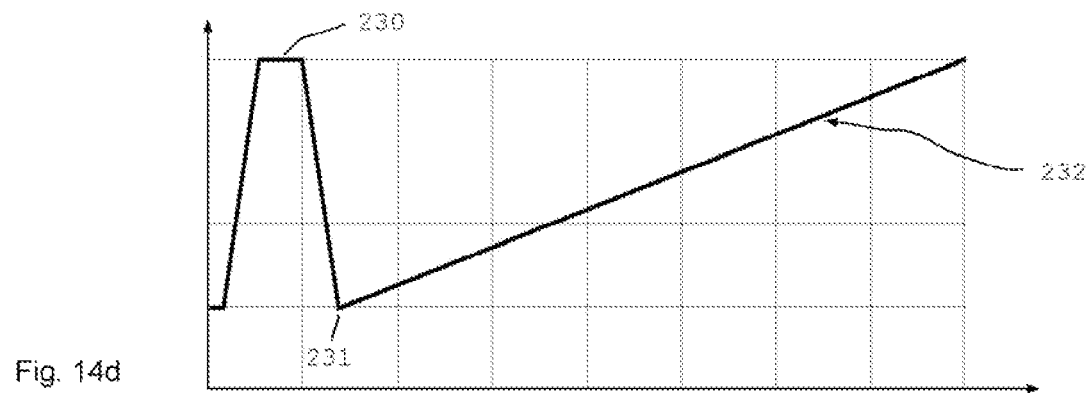

FIG. 14*d* shows the possible use when answering, for example, a telephone call. The operating element 503 of the input apparatus 502 can be rotated with low resistance, for example minimally, or practically not at all. The required torque increases steeply or alternatively suddenly to the threshold 230, After the threshold 230 has been passed, an incoming telephone call or video conference call, for example, can be answered. The rotational resistance falls to a relative minimum torque 231. Immediately afterward, the function of the operating element 503 is changed here. In the case of further rotation, the volume of the call, for example, is changed. The required torque is here increased linearly according to the slope 232. It is also possible that the progression is not linear. It is also possible that, beyond a certain volume, a more pronounced slope is set or the required torque is increased suddenly by a certain amount.

It is also possible in all cases that, in the case of, for example, a ripple (detent pattern), unlike previously where a switch is made between a lower and higher current strength with the same polarity (i.e., for example, +0.2 to +0.8A=ripple), instead a switch is made alternately with a changed polarity, i.e. from +0.2A to +0.8A and then the next ripple with −0.2A to −0.3A and then the next torque peak from +0.2A to +0.8A, etc.

The preferably low-alloy steel can contain a residual magnetic field. The steel is preferably demagnetized regularly or as required (inter alia, by a special alternating field). The material FeSi3P (silicon steel) or a related material is preferably used for the components through which the magnetic field flows.

In all cases, voice or sound control can be performed. The braking apparatus can be controlled adaptively by voice control.

If the rotary unit is not rotated, i.e. the angle is constant, the power is preferably continuously reduced over time. The power can also be varied depending on the velocity (rotational angular velocity of the rotary unit).

In the invention, a haptic rotary knob or a thumb roller or alternatively a push button with haptic feedback is, for example, installed as an operating element in a (smartphone) sleeve (sleeve part).

Examples of Possible Applications

Adjusting the volume whilst telephoning: the louder the setting, the greater the torque required at the operating element. A stop is generated (very high torque) when the volume can no longer be increased or a critical volume is reached.

Zooming when taking a photograph without moving fingers to the display: the brake applies a certain torque (for example, increase in torque with increasing focal length) for as long as the optical zoom is being adjusted. If a shift is made from the optical zoom to the digital zoom range, the user first feels a short stop (high torque) and then a detent pattern/ripple. The user thus realizes that he is in the digital zoom range. It is also advantageous and preferred that the ability to move or the feedback of the input element is set depending on a zooming procedure. In particular, a different torque is set for zooming in than for zooming out. For example, there is a higher torque for zooming in than for zooming out, or vice versa. The same applies when the tendency to camera shake becomes greater, for example with increasing focal length. As soon as the user is susceptible to the risk of camera shake, this is signaled haptically at the operating element, wherein this (camera shake) range is changed dynamically depending on the situation (light conditions due to 16 shutter speed, etc). In the case of a two-zone operating 17 element according, for example, to FIG. 3, the zoom (focal length) can be set with one zone coarsely or in coarse focal length steps with which a correspondingly coarse detent pattern (torques at the operating element) 21 is associated, and fine setting can be performed with the other zone. Fast, precise, and secure setting is thus possible.

The shutter speed can, as described above, also be set instead of the zoom (focal length), or the focal length set with one actuating zone and the shutter speed with the other actuating zone, wherein clear haptic feedback results when there is a risk of camera shake or other situations arise which would adversely affect the picture quality.

Adjusting the volume of music: short barrier/short stop at preferred volume. If the music is too loud, the operating element can be rotated stiffly. If the music is so loud that there is a disruptive influence on the surroundings, the user receives haptic feedback. This is in turn dynamically adapted to the situation. In quiet surroundings (for example, an office), the 2 feedback threshold is lower than in loud surroundings (for example, the subway; trains; airplanes). The screen brightness can also be adjusted (for example, if the ambient light is too bright and nothing can be seen on the screen and as a result it is not possible to see what is being adjusted).

Browsing through a contacts list, list of songs (playlist), files, etc.

Scrolling through websites, files, etc.

The operating element can also be operated when gloves or Band-aids are being worn because mechanical rotation takes place and the touch of the skin is not detected as is the case with a touch-sensitive screen!

The user can set the raster width as desired.

Childproof lock: the torque of the operating element for operation can be increased to such an extent that, for example, a child/young person cannot rotate it because they cannot apply an adequate muscular tangential force and hence cannot operate, preferably cannot switch on, the device.

Modular Structure:

The user can easily retrofit a smartphone sleeve to his smartphone. The operating element described can, however, also be integrated directly in the smartphone or in a smart device.

The sleeve can additionally contain a battery in order to increase the operating time of the device. It is, however, not absolutely necessary.

The advantage of an extra installed battery would be that the haptic rotary knob (the thumb roller) can draw power directly from this battery and also communicate with the smartphone via the power line (transmission of power from the extra battery to the smart device) which is then present in any case. The connection to the smartphone can be effected either via a connector into the charging or general port or via Bluetooth, NFC, infrared, or a different type of wireless data transmission.

The battery in the sleeve can either be charged conventionally by a cable or by means of inductive charging. The battery of the smartphone can also be charged inductively from the battery of the sleeve.

Reduction in Operating Knobs

Assisted-operation smartphones and other smart devices with no or few operating knobs (for example, smartphone which can only be operated via touchscreen)

Modern smartphones today have significantly reduced the number of push knobs. Usually, everything is operated just via the display. However, many options cannot be set via the display, for example adjusting the volume (especially when telephoning and the phone is held to the ear). When taking a photograph with the smartphone, it is also not optimal to trigger the camera via the screen as this can cause camera shake and the smartphone is not held stably in the hand/both hands.

Many smartphone manufacturers attempt to reduce the number of knobs/buttons, etc as much as possible for design reasons but also in order, for example, to make the device waterproof.

The fewer movable parts there are, the less possibility there is of dirt and water being able to penetrate inside, Operating buttons and rotary wheels in the sleeve, i.e. as it were outside the smartphone, obviate this problem. If design is not that important to a user and instead they value greater flexibility and user-friendliness, such a sleeve represents a good option for improving the telephone or adapting it to their own demands without there being any need to buy a brand-new device. Many users want to protect their smartphone with an additional sleeve so it is logical to equip the sleeve at the same time with additional functions. The user thus does not have to do without, for example, a rotary knob on the edge.

The sleeve can be connected to the smartphone via a connector (in the socket for the charging cable) or connected via wireless data transmission.

It is in principle similar to a conventional protective sleeve for smartphones which also contains additional telephone peripherals.

Mounting options for the operating element (here a rotary knob or a thumb/finger roller) in the sleeve part (sleeve) are shown in FIG. 1. A sleeve apparatus according to the invention for a smartphone is shown in FIG. 2, in which the operating element is arranged on the side. In addition, a battery is integrated into the sleeve part.

Reduction in Number of Different Parts/Interchangeable Parts:

The combination of a touch display (visual display) and a haptic knob can be used in different applications. The same basic configuration (hardware) can be "adapted" by different software. For example, volume control, scrolling through contacts, etc.

Cost

A braking apparatus such as that shown in DE 10 2018 100 390 A1 (a so-called wedge bearing) can be produced cost-effectively. It has a small number of simple parts made from a standard material and, by virtue of the wedge effect, produces a very high torque relative to its size. In addition, the power consumption is also very low. An MRF brake could therefore be supplied with power simply via the battery of the smartphone or directly from the smart battery case.

Modularity-Smartphones for Left-Handed People

The structure of a sleeve apparatus (sleeve) according to the invention can be changed relatively simply. The position of the haptic operating knob or the thumb roller can be moved to the other side (from the right-hand side to the left-hand side) without changing the design greatly. This is not as simple in a smartphone because the whole internal architecture has to be changed. The traces etc have to run in a different way. A sleeve does not have as many components which have to be considered. In addition, communication between the smartphone and the thumb roller can be effected via Bluetooth. The Bluetooth module can be installed directly with the thumb roller, i.e. only a power connection to the battery is required.

Two different sleeves for right- and left-handed people can consequently be produced relatively favorably, or even more different sleeves in which the position of the knob varies depending on what the primary use of the knob is (for taking photographs, changing the volume during a call, using the index finger or thumb to operate the device, etc).

The sleeve could also be produced in a modular fashion such that the wedge bearing can be used in different locations. Different openings, which have the necessary ports for power supply and data transmission, are provided in the sleeve. The wedge bearing can then be removed from the opening/holder and inserted into another one. It is thus possible to switch from right-handed to left-handed mode. Or the knob is moved from the bottom to the top region of the smartphone.

Haptic Rotary Knob with Different Zones

A rotary knob can have a plurality of actuating zones (zones) which, for example, have different surfaces (ribbed in different directions, completely smooth, coarse, or fine), for example in three zones. However, the knob has just one control system, sensor, and damping apparatus, but the haptic feedback can differ depending on at which location it is actuated/touched. The user thus knows that he is now adjusting something different. Sensors detect where it is being actuated/touched. If a user moves a finger to the rotary knob, the sensors detect to which region the finger is going and then activates the associated function.

Different functions can thus be controlled with the same rotary knob without there being any need to rearrange or select anything first.

A sleeve apparatus according to the invention with two actuating zones is shown in different views in FIG. 3.

A sleeve apparatus according to the invention with three actuating zones is shown in different views in FIG. 4.

A sleeve apparatus according to the invention with two actuating zones (on the left) and three actuating zones (on the right) and the corresponding sensors is shown in FIG. 5.

Example

The rotary knob has two zones: the volume of media playback is set with one zone (increasing torque with increasing volume), and the song is selected with the second zone (forward/back, i.e. a haptic detent function. Stronger detents or higher braking torque for favorite songs), Or the second zone has a completely different function (camera zoom).

Different technologies can be used for the sensors. For example, a proximity sensor in the vicinity of the respective region, or capacitive sensors on the thumb roller, inductive sensors, the camera (image recognition) of the smart device, etc. The sensors can be attached next to or on the roller.

Any number of zones (1, 2, 3, . . . ) is possible but a preferred number is probably 3. The MRF damper is attached in one of the zones and the other zones are connected non-rotatably to this zone. The zones can be equipped with different surfaces (the surfaces do not necessarily need to be different but this does allow intuitive operation), As mentioned, the haptic feedback can be different in the different zones. There can be different ripples with different spacings between the resistance barriers, the resistance can be constant in the zones, with different strength, etc. Because all the zones are braked with the same MRF braking unit, of course all the zones always rotate simultaneously but the control system recognizes via the sensors which zone is being actuated and then controls the correct function by means of software (therefore the volume is not controlled at the same time as the camera zoom is changed). The sensor for determining the position of the finger is of course only for that purpose and an additional sensor will still be required to measure the rotation of the thumb roller.

The great advantage of this type of use of a knob with different zones is that just one control system and also just one damper need to be used in order to be able to control multiple functions.

Figure 15:
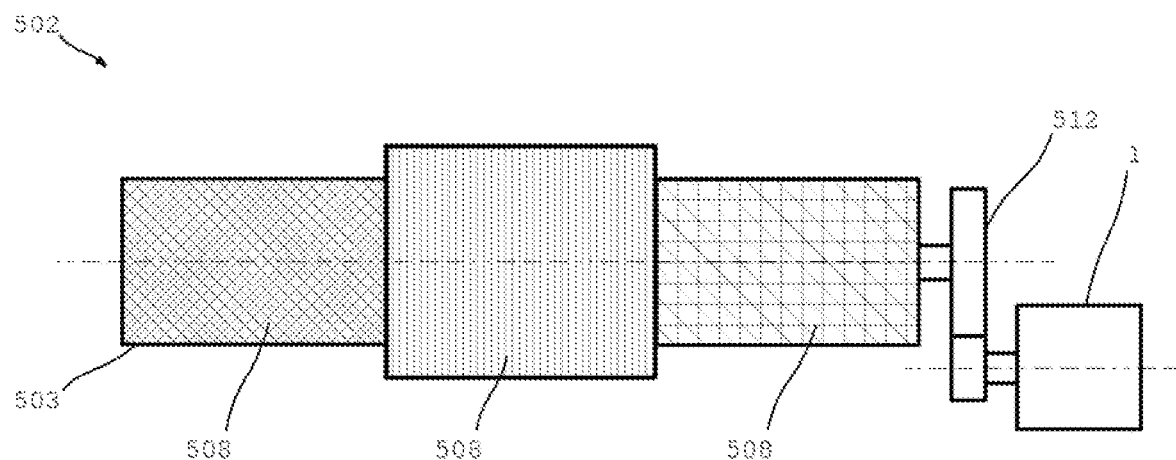
FIG. 15 shows a purely schematic illustration of an input apparatus with a gear unit.

FIG. 15 shows in section an input apparatus 502 as was described above, for example. The braking apparatus 1 is here coupled to the operating element 503 via a gear unit 512. A higher (braking) torque can be obtained as a result. In addition, the gear unit 512 straddles the axes of rotation (drawn in dot-dash lines), here arranged so that they are offset in parallel, of the operating element 503 and the braking apparatus 1.

Figure 16:
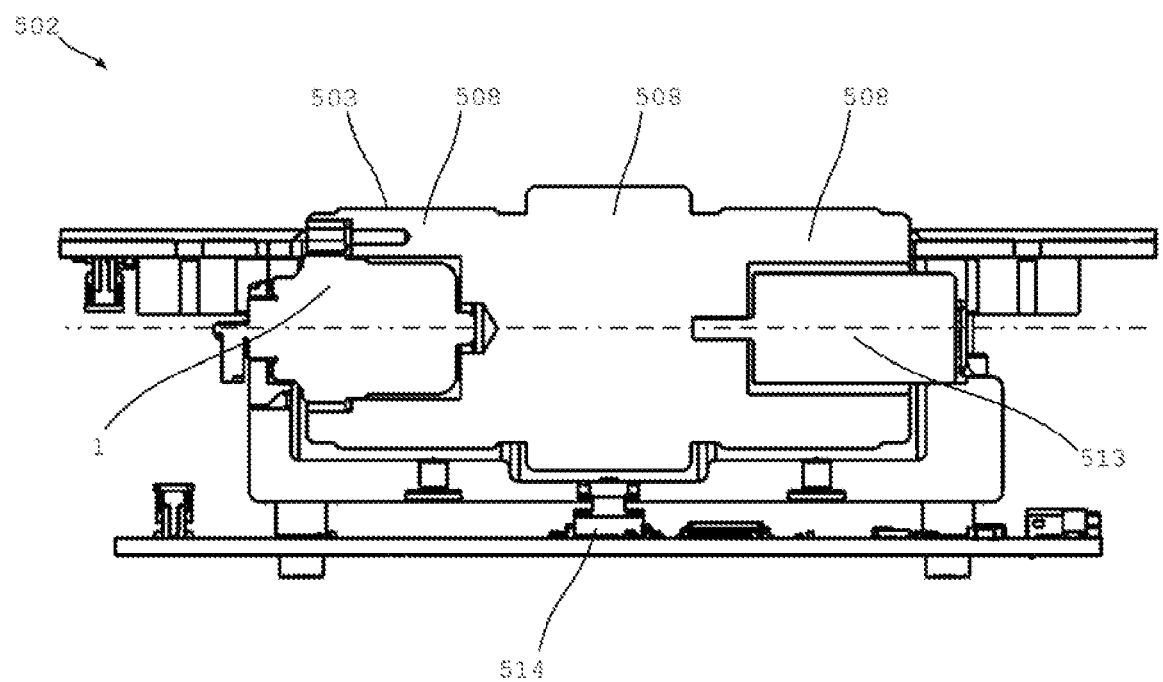
FIG. 16 shows a purely schematic illustration of an input apparatus with a drive apparatus in a view in section.

An input apparatus 502, in which the operating element 503 can also be actively rotated by a drive apparatus 513 in addition to manual rotation, is shown in FIG. 16. Such an active drive can advantageously be used for all the input apparatuses 502 described here. The drive apparatus 513 is here arranged opposite the braking apparatus 1 and has the same axis of rotation (drawn in a dot-dash line) as the operating element 503 and the braking apparatus 1. This enables particularly compact accommodation.

Clearly visible here is a switch unit 514 which can be actuated by pressing the operating element 503. The switch unit 514 is here equipped with a pressure sensor. As a result, an input can take place depending on how strongly the operating element 503 is pressed. The switch unit 514 can also be designed as a switch without a pressure sensor.

In all exemplary embodiments and designs, it is also possible that the braking apparatus has a motorized design. For example, an electric motor can be supplied with power in a targeted fashion in order to generate a desired braking torque.

Possible Haptic Feedback

Mechanical devices, for example a rotary knob of an old radio, can be simulated with rapidly switchable MRF dampers. The knob is first rotated counter to high resistance, until this is overcome, in order to switch the radio on. The radio is then switched on and the volume can be set by further rotation.

With the thumb roller, a high resistance until rotation by a small angular range can also first be set during actuation.

The resistance is then reset to the minimum value and the resistance slowly increases with the angle of rotation, the higher the volume becomes (cf FIG. 6). For example, the media player of the smartphone can also be switched on in this way and the volume then set in the same way.

Declining a call is usually accompanied by adjusting the volume (the volume needs to be adapted depending on the quality of the connection, the surrounding noise, etc). Both actions can be performed effectively, simply, and quickly via 9 the rotary knob. Unintentional declining of a call thus also occurs less often.

The concept of a haptic rotary knob in the sleeve can also be implemented on tablets and all types of portable smart devices in which few or no knobs are installed in the device itself.

Pinch to Zoom

Pinch to zoom describes the possibility of zooming using two fingers by moving them apart or together. In smartphones, this type of zooming is impossible or possible only with difficulty in the case of one-handed operation. A rotary knob which can be operated, for example, with the thumb or on the other side with the index finger could enable one-handed operation when, for example, zooming.

Operation with Gloves (Winter, Cold, Hygiene, Etc)

Smart watches for the most part have a capacitive display which can hardly be operated or, depending on the manufacturer, cannot be operated at all with gloves. A haptic switch here has clear advantages. When using a smartphone, it is accepted that a glove has to be taken off first because the smartphone has to be taken out of a pocket (i.e. a relatively long process). The purpose of a smart watch, however, is rapid access to information. For hygiene reasons (infection; virus) gloves need to be kept on, which makes operation of smart devices with a touch screen difficult to impossible.

Erroneously Identifying Scrolling as Pressing

Because of the small display, scrolling is often erroneously identified as pressing. This cannot happen with a rotary knob.

Intelligent Reading:

Zooms to a readily readable size and then, with rotation, always in the same way as a person would also read a passage of text. In other words, it skips back to the beginning at the end of the sentence. The text here always remains at the same height (in the same reading region) so that the eye does not have to skip back and forth.

Answering and Declining Calls

In the case of a call, the call is answered or declined depending on the direction of rotation by a certain angle with a stop (for example, clockwise for declining, counterclockwise for declining/not answering). In the case of declining, by rotating the knob it is possible to scroll through predefined messages (responses) and send these to the caller by pressing the knob (for example, I'm in a meeting at the moment).

Visual Impairment (Possibly in Combination with Hearing Impairment)

People with a visual impairment (blind people) can receive assistance in the form of corresponding feedback, for example in the form of Morse code.

Faulty Display/SOS/Emergency Call:

In the case of a faulty display, basic operation can still be selected if the operating element as described in FIG. 6 is used. Different people or functions can also be selected by rotation with a detent pattern/ripples if the names/functions are played back via the loudspeaker.

SOS actuation (short/long/short) of the operating element can be detected and corresponding functions performed.

Power Saving:

The abovedescribed "faulty display" function can also be used when the battery is running low, i.e. when power/energy needs to be saved. The display can be significantly dimmed in a first step because declining a call, controlling the volume, and hanging up can be performed reliably via the adaptive operating element. The display brightness can be adapted quickly and reliably via the two-zone controller (according, for example, to FIG. 3) if more brightness is required. In a second energy-saving step, the display with an intensive consumption of energy can be switched off altogether.

Selecting Different Cameras

An ever increasing number of cameras are being installed in new smartphones. Normally, there is one on the rear and a selfie camera on the front. However, more and more frequently additional cameras such as, for example, a wide-angle camera ox in the future also telephoto lenses are being added. The optical zoom can be operated by the thumb roller and it is possible to switch back and forth simply and quickly between the cameras with the thumb roller. Multiple cameras can be adjusted/operated simultaneously with the abovedescribed design with multiple zones.

Example of Thumb Roller Structure

The thumb roller is preferably a horizontal wedge bearing which has a very narrow design. The rolling bodies in this case are also cylindrical rollers but with a small diameter (for example, 1 mm) and a larger axial extent (for example, 5 mm). The magnetic coil can be configured so that it is either horizontal (wound in the axial direction) or in a radial direction (coil wound about the axis).

As is the case for all the other actuators for haptic feedback, the thumb roller also needs a sensor which measures the rotation. A rotary encoder or alternatively a magnetic ring with a Hall effect sensor can be used for this purpose.

The same haptic feedback can in principle be implemented with the thumb roller as with every other rotary knob with a wedge bearing. Less high torques can be generated because of its small structural space. However, this is also not necessary at all because of the small diameter.

DE 10 2018 100 390 A1 and WO 2019/138015 describe thumb rollers with an axial coil and enable particularly narrow actuators.

Installation Options

The roller can be installed in the smartphone sleeve either with an axial direction parallel to the smartphone or rotated by 90°. The respective type can be better depending on which fingers are generally used for the rotation. However, a normal knob with a wedge bearing is better suited for the latter option because it can have a structure which is shorter but for this purpose is larger in the radial direction.

Push

The thumb roller can also have a push function (the thumb roller is here pressed). This can be for confirming a function, for switching (on/off), as a return, alternatively any other function (for example, one defined by the customer such as, for example, declining or hanging up the call). The push function can also have multiple stages (and be adaptive).

Adaptive Hinge in Foldable Smartphones

The first foldable smartphones are now on the market. These smartphones are folded together to the same size as a normal smartphone and, when unfolded, are accordingly twice as large. One-handed operation is consequently even more difficult, for which reason a rotary knob would have advantages here (zooming, declining a call, etc). On the one hand, the screens are much too large in order to reach the whole surface and, on the other hand, the smartphone can inadvertently be folded together.

This can be remedied by a sleeve being equipped with thumb rollers as hinges (cf FIG. 7 and FIG. 8). When the smartphone is folded open, the thumb rollers are blocked in the open state and the smartphone cannot be folded together as easily. In this case too, the thumb rollers can be fed from an additional battery from the sleeve.

For kinematic reasons, the thumb roller must here be mounted exactly at the pivot point. This is difficult because the smartphone or the display are situated there. Therefore, it is possible either to install the thumb roller directly in the smartphone or special linearly displaceable hinges have to be used. Of course, in this type of sleeve, a haptic operating knob can also be installed at the edge, as described above.

Touchpad Sleeve with Adaptive Hinges

The foldable sleeves of tablets or touchpads can also be equipped with such hinges so that the sleeve can be held in any desired position, Adaptive Hinges for Laptops The screen of a laptop can be braked simply with thumb rollers because the screen is fastened at the pivot point. When moving the screen, the thumb rollers can be set to the lowest resistance and, when the desired position is reached, the resistance is set to the maximum value.

Reading Aid for Books

The idea of hinges for sleeves of smartphones and tablets, etc can also be used with normal "analog" books. A simple frame with a hinge with thumb rollers as dampers is made which is pushed into the book between the pages. The frame then holds the book open and the reader can hold the book more comfortably, Adaptive Selection of Functions The button allocation changes depending on the function selected. If the camera is selected as the element to be operated, the button receives the zoom function or the function that the user selects the most. The customer can then preset this themselves or the device itself selects it based on internal user data analysis. Artificial intelligence or machine learning can here also improve the user guidance and reduce operating complexity.

The invention relates in particular to a device with the haptic rotary knob/thumb roller in a sleeve for smartphones; the thumb roller enables operation of the smartphone for different apps which are controlled by the smartphone; the haptic feedback is, for example, an increase in the resistance during rotation; the use of sensors for measuring the rotational movement implies no restriction.

The invention provides in particular the use of MRF in the actuator.

The invention provides in particular communication between the haptic rotary knob and the smartphone via connectors or wireless transmission such as, for example, Bluetooth, NFC, infrared, etc.

The invention provides in particular use of an additional battery in the sleeve in order to operate the actuator. The MRF actuator is in particular designed as a wedge bearing with rolling bodies with a radial or axial coil.

The invention provides in particular a modular structure. This makes it possible to change the position of the actuator.

Haptic feedback can also be reinforced acoustically (via a loudspeaker) or visually (lamp, LED, notification in the display, illumination of the operating element, etc.). The invention presented here can be employed in different technical fields, for example, smartphones, smart watches or smart devices, (touch) tablets, small displays, ANDROID® apps, APPLE® (iOS) apps, photography, sleeves for cameras, remote controls, Office PCs, gaming (computer mice, keyboards, controllers), computer mice, hi-fis, or televisions.

LIST OF REFERENCE NUMERALS 1 magnetorheological braking apparatus
2 braking component
3 braking component
4 holder
5 gap, channel
5a gap width
6 medium
8 field
9 clearance
10 acute-angled region
11 transmission component, rolling body, rotary body
11d arm
12 axis of rotation
13 rotary part
13a internal diameter
13b external diameter
13c height
13d wall thickness
13e sleeve part (1x drawing)
14 ball
15 cylinder
16 wedge shape
17 direction of relative movement
18 direction of relative movement
19 magnetic particles
20 axial direction
21 core
21b minimum diameter
23 rotary knob
24 outer ring
25 radial direction
26 coil
26a maximum diameter
26c coil plane
26d radial direction relative to 26c
27 control device
28 potting compound
30 bearing
32 transverse groove
33 base body
35 cable bushing
36 receptacle
36a external diameter
37 cylindrical running surface
38 seal.
43 user interface
45 cable
46 sealing ring
48 sliding guide
49 cover
50 console
61 angular segment
62 angular segment
63 receptacle for
64 outer surface
65 radial gap size
66 radial spacing
67 inner surface of 13
68 signal
69 amplitude
70 sensor apparatus
71 magnetic ring unit
72 magnetic field sensor
73 sensor line
74 button
75 shielding apparatus
76 shielding body
77 separating unit
78 uncoupling apparatus
110 closed chamber
111 first end of
112 first bearing location
113 agnetic field-generating apparatus
114 volume of
115 second end of the closed chamber
116 diameter of first bearing location
117 diameter of second bearing location
118 second bearing location
119 axle stub
120 compensating channel
121 end section of 2
122 radial direction (overall)
200 device component
226 detent point
228 end stop
229 end stop
230 threshold
231 minimum torque
232 slope
237 angular spacing
238 stop torque
239 detent torque
240 basic torque
500 sleeve apparatus
501 sleeve part
502 input apparatus
503 operating element
505 sensor apparatus
506 control apparatus
507 holding apparatus 508 actuating zone
509 hinge apparatus
510 mobile device
511 sleeve section
512 gear unit
513 drive apparatus
514 switch unit
518 monitoring apparatus
520 device body
528 sensor
530 device parts
540 energy store

The invention claimed is:

1. A sleeve apparatus for a mobile device, the sleeve apparatus comprising:
    a sleeve part for at least partially encasing the mobile device; and
    an input apparatus mounted to said sleeve part, said input apparatus being configured to activate the mobile device held in said sleeve part;
    said input apparatus including at least one movable operating element and at least one braking apparatus, said braking apparatus being configured to damp a movement of said operating element in a targeted fashion; and
    a sensor configured to detect an actuating position of said operating element, and a control apparatus configured to actuate said braking apparatus depending on the actuating position of said operating element.

2. The sleeve apparatus according to claim 1, wherein said braking apparatus is a magnetorheological brake.

3. The sleeve apparatus according to claim 2, wherein said braking apparatus comprises a magnetorheological medium and a field-generating apparatus for generating and controlling a magnetic and/or electrical field strength, and wherein said field-generating apparatus is configured to influence said medium in order to set a torque for a rotatability of said operating element.

4. The sleeve apparatus according to claim 1, wherein a damping of said operating element is set depending on an angle of rotation, detected by said sensor, and adapted in a targeted fashion.

5. A sleeve apparatus for a mobile device, the sleeve apparatus comprising:
    a sleeve part for at least partially encasing the mobile device; and
    an input apparatus mounted to said sleeve part, said input apparatus being configured to activate the mobile device held in said sleeve part;
    said input apparatus including at least one movable operating element and at least one braking apparatus, said braking apparatus being configured to damp a movement of said operating element in a targeted fashion; and
    a control apparatus configured for activating said braking apparatus in dependence on at least one control command and for converting the control command into a haptic signal that is perceptible at said operating element, to provide a user with haptic feedback as a consequence of an input by the user through said operating element.

6. The sleeve apparatus according to claim 5, wherein the control command is issued by the mobile device, by an application installed on the mobile device, or by said control apparatus.

7. The sleeve apparatus according to claim 1, wherein said input apparatus is configured to be coupled to the mobile device wirelessly or by a wired connection, enabling the mobile device held in the sleeve part to be operated by said input apparatus and/or enabling the mobile device to transmit signals to said input apparatus.

8. The sleeve apparatus according to claim 1, further comprising an electrical energy storage device for supplying said input apparatus with electrical energy or wherein said input apparatus is supplied with energy from an energy store of the mobile device.

9. A sleeve apparatus for a mobile device, the sleeve apparatus comprising:
    a sleeve part for at least partially encasing the mobile device; and
    an input apparatus mounted to said sleeve part, said input apparatus being configured to activate the mobile device held in said sleeve part;
    said input apparatus including at least one movable operating element and at least one braking apparatus, said braking apparatus being configured to damp a movement of said operating element in a targeted fashion; and
    said sleeve part and said input apparatus being optimized for operation by a right-handed user or said sleeve part and said input apparatus being optimized for operation by a left-handed user.

10. The sleeve apparatus according to claim 1, wherein said sleeve part comprises two holding cases each for holding one input apparatus, and wherein said input apparatus is selectively inserted into one of said holding cases.

11. The sleeve apparatus according to claim 1, wherein said operating element comprises at least two actuating zones, and wherein a movement of said operating element can be damped in a targeted fashion depending on the actuating zone at which said operating element is actuated (e.g., touched).

12. The sleeve apparatus according to claim 11, wherein the actuating zones are haptically distinguishable by way of a feature selected from the group consisting of a different surface, a different surface structure, a different size, a different geometry, a different color, and a different material, and wherein the haptic feedback takes place depending on the actuating zone in which the operating element is actuated (e.g. touched).

13. The sleeve apparatus according to claim 11, wherein the actuating zones are configured for operating in each case at least one specific function of the mobile device such that a different function of the mobile device can be activated depending on which of the actuating zones is actuated.

14. The sleeve apparatus according to claim 11, wherein an actuation of a respective actuating zone is detected via sensors by at least one monitoring apparatus.

15. The sleeve apparatus according to claim 1, wherein a first input is executed by a first movement of the operating element, and wherein at least one further input is executed by moving the operating element further, and wherein a different damping is provided for the first movement than for the further movement, and wherein a targeted increase in a retarding torque takes place after the first movement such that additional force needs to be expended for the further movement.

16. The sleeve apparatus according to claim 15, wherein at least one function is started by the first movement of the operating element, and wherein an adaptation of the function takes place by the further movement of the operating element.

17. The sleeve apparatus according to claim 1, wherein the control apparatus is configured for supplying a haptic signal which is perceptible at the operating element and which serves as an aid for a user having an impairment.

18. The sleeve apparatus according to claim 1, wherein a movement of said operating element executes at least one action selected from the group consisting of zooming, scrolling, selecting a camera, controlling a call, and selecting a menu.

19. The sleeve apparatus according to claim 1, wherein said operating element is configured to move a highlight of a display region by at least one movement of said operating element, and to activate a highlighted operation by pushing or rotating of said operating element.

20. A sleeve apparatus for a mobile device, the sleeve apparatus comprising:
- a sleeve part for at least partially encasing the mobile device; and
- an input apparatus mounted to said sleeve part, said input apparatus being configured to activate the mobile device held in said sleeve part;
- said input apparatus including at least one movable operating element and at least one braking apparatus, said braking apparatus being configured to damp a movement of said operating element in a targeted fashion;
- said sleeve part being a foldable structure and having at least two sleeve sections which are movably connected by at least one hinge, and said input apparatus being integrated into said hinge apparatus.

* * * * *